United States Patent
Hirokawa et al.

(10) Patent No.: US 8,947,721 B2
(45) Date of Patent: Feb. 3, 2015

(54) IMAGE FORMING APPARATUS, BACKUP AND RESTORE PROCESSING METHOD

(71) Applicants: Tatsuma Hirokawa, Tokyo (JP); Yukio Yamaguchi, Chiba (JP); Masataka Yamazaki, Kanagawa (JP)

(72) Inventors: Tatsuma Hirokawa, Tokyo (JP); Yukio Yamaguchi, Chiba (JP); Masataka Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 13/647,414

(22) Filed: Oct. 9, 2012

(65) Prior Publication Data

US 2013/0128313 A1    May 23, 2013

(30) Foreign Application Priority Data

Nov. 22, 2011 (JP) ................................. 2011-255351
Aug. 20, 2012 (JP) ................................. 2012-181550

(51) Int. Cl.
*G06F 15/00* (2006.01)
*G06F 3/12* (2006.01)
*H04N 1/00* (2006.01)
*H04N 1/32* (2006.01)

(52) U.S. Cl.
CPC .......... *G06F 3/1204* (2013.01); *H04N 1/00965* (2013.01); *H04N 1/32106* (2013.01); *G06F 3/1229* (2013.01); *G06F 3/1285* (2013.01); *H04N 2201/3276* (2013.01); *H04N 2201/0094* (2013.01); *H04N 2201/3202* (2013.01)
USPC ........................................................ 358/1.16

(58) Field of Classification Search
USPC ........................................................ 358/1.16
See application file for complete search history.

(56) References Cited

U.S. PATENT DOCUMENTS

2006/0184703 A1* 8/2006 Shibata .......................... 710/104
2007/0086022 A1   4/2007 Kumagai
2009/0015867 A1* 1/2009 Ukegawa ...................... 358/1.16

FOREIGN PATENT DOCUMENTS

| JP | 2001-053913 | 2/2001 |
| JP | 2007-128493 | 5/2007 |
| JP | 4246021 | 4/2009 |

* cited by examiner

*Primary Examiner* — Saeid Ebrahimi Dehkordy
(74) *Attorney, Agent, or Firm* — Harness, Dickey & Pierce, P.L.C.

(57) ABSTRACT

An image forming apparatus operates according to setting information, and includes a storage unit for storing the setting information; an interface for connecting a portable storage medium; a processing unit for reading/writing the setting information from/to the storage unit, and reading/writing the setting information from/to the portable storage medium via the interface, and a log creating unit for creating a first processing result log indicating a first processing result of a reading/writing process when the processing unit reads the setting information from the storage unit and writes the setting information in the portable storage medium, and storing the first processing result log, and creating a second processing result log indicating a second processing result of a reading/writing process when the processing unit reads the setting information from the portable storage medium and writes the setting information in the storage unit, and storing the second processing result log.

17 Claims, 22 Drawing Sheets

DATE/TIME: 2010-03-25T15:16:53+0900
PROCESS TYPE: EXPORT
PROCESS RESULT: SUCCESS
SETTING INFORMATION:0325.txt
DEVICE ID: ABC001
IP ADDRESS: 192.168.1.1
INSTALL LOCATION: ***OFFICE FLOOR* IN FRONT OF FRONT ENTRANCE
DEVICE MODEL: MANUFACTURED BY** MF** TYPE A
STORAGE LOCATION OF DEVICE SETTING INFORMATION: USB

DATE/TIME: 2010-03-25T15:16:53+0900
PROCESS TYPE: EXPORT
PROCESS RESULT: SUCCESS
SETTING INFORMATION-0325.txt
DEVICE ID: ABC001
IP ADDRESS: 192.168.1.1
INSTALL LOCATION: ***OFFICE FLOOR* IN FRONT OF FRONT ENTRANCE
DEVICE MODEL: MANUFACTURED BY** MF** TYPE A
STORAGE LOCATION OF DEVICE SETTING INFORMATION: 192.168.1.200

FIG.6C

```
DATE/TIME: 2010-04-2T15:10:10+0900
PROCESS TYPE: IMPORT
PROCESS RESULT: SUCCESS
SETTING INFORMATION:0325.txt
DEVICE ID: ABC001
IP ADDRESS: 192.168.1.1
INSTALL LOCATION: ***OFFICE FLOOR*  IN FRONT OF FRONT ENTRANCE
DEVICE MODEL: MANUFACTURED BY****  MF****  TYPE A
STORAGE LOCATION OF DEVICE SETTING INFORMATION: USB
```

FIG. 6D

DATE/TIME: 2010-04-2T15:10:10+0900
PROCESS TYPE: IMPORT
PROCESS RESULT: SUCCESS
SETTING INFORMATION:0325.txt
DEVICE ID: ABC001
IP ADDRESS: 192.168.1.1
INSTALL LOCATION: ***OFFICE FLOOR* IN FRONT OF FRONT ENTRANCE
DEVICE MODEL: MANUFACTURED BY** MF** TYPE A
STORAGE LOCATION OF DEVICE SETTING INFORMATION: 192.168.1.200

FIG.7

SYSTEM MANAGEMENT SCREEN

SEARCH CONDITION

PERIOD: 2010 03 25 ~ 2010 03 25 ☑ LOCAL DISK  ☑ USB MEMORY

PROCESS TYPE: ALL

STORAGE LOCATION: ALL

STORAGE LOCATION: ALL

[DETAILED SEARCH]

| DATE/TIME | PROCESS TYPE | PROCESS RESULT | DEVICE ID | IP ADDRESS | INSTALL LOCATION | STORAGE LOCATION |
|---|---|---|---|---|---|---|
| 2010-03-25 T05:00:00+0900 | EXPORT | SUCCESS | ABC001 | 192.168.1.1 | ***OFFICE FLOOR* IN FRONT OF FRONT ENTRANCE | 192.168.1.200 |
| 2010-03-25 T05:00:03+0900 | EXPORT | SUCCESS | ABC002 | 192.168.1.2 | ***OFFICE FLOOR* NORTH SIDE CENTER | 192.168.1.200 |
| 2010-03-25 T05:00:10+0900 | EXPORT | SUCCESS | ABC003 | 192.168.1.3 | ***OFFICE FLOOR* SOUTH SIDE CENTER | 192.168.1.200 |
| 2010-03-25 T05:00:15+0900 | EXPORT | SUCCESS | ABC004 | 192.168.1.4 | ***OFFICE FLOOR* SOUTH SIDE COMMON AREA | 192.168.1.200 |
| 2010-03-25 T05:00:19+0900 | EXPORT | DEVICE ERROR | ABC005 | 192.168.1.5 | ***OFFICE FLOOR* EAST SIDE CENTER | 192.168.1.200 |
| 2010-03-25 T15:16:53+0900 | IMPORT | SUCCESS | ABC001 | 192.168.1.1 | ***OFFICE FLOOR* IN FRONT OF FRONT ENTRANCE | USB |

[CONFIRM DETAILS]

FIG.11A (WHEN RESTORE PROCESS STARTS)

To:admin-user001@yyy.co.jp
From:192.168.1.1@yyy.co.jp

[TITLE]
DEVICE ID: IMPORT TO ABC 001 (START)

[MAIN BODY]
EXECUTOR:  admin-user001
DATE/TIME: 2010-03-25T15:16:53+0900
PROCESS TYPE: IMPORT
PROCESS STATUS: START
PROCESS RESULT: -
SETTING INFORMATION:0325.txt
DEVICE ID: ABC001
IP ADDRESS: 192.168.1.1
INSTALL LOCATION: ***OFFICE  FLOOR*  IN FRONT OF FRONT ENTRANCE
DEVICE MODEL: MANUFACTURED BY**  MF**  TYPE A
STORAGE LOCATION OF DEVICE SETTING INFORMATION: USB

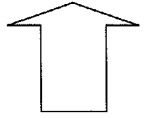

FIG.11C (WHEN RESTORE PROCESS ENDS)

To:admin-user001@yyy.co.jp
From:192.168.1.1@yyy.co.jp

[TITLE]
DEVICE ID: IMPORT TO ABC 001 (END)

[MAIN BODY]
EXECUTOR: admin-user001
DATE/TIME: 2010-03-25T15:17:55+0900
PROCESS TYPE: IMPORT
PROCESS STATUS: END
PROCESS RESULT: SUCCESS
SETTING INFORMATION:0325.txt
DEVICE ID: ABC001
IP ADDRESS: 192.168.1.1
INSTALL LOCATION: ***OFFICE FLOOR* IN FRONT OF FRONT ENTRANCE
DEVICE MODEL: MANUFACTURED BY** MF** TYPE A
STORAGE LOCATION OF DEVICE SETTING INFORMATION: USB

FIG.17A (SETTING INFORMATION FOR IMAGE FORMING APPARATUS 1b)

```
SETTING INFORMATION "0325.txt"
DATE/TIME: 2010-03-25T05:00:19+0900
BACKUP SOURCE: ABC001

SETTING PARAMETER 1 : xxx
SETTING PARAMETER 4 : xxx
```

FIG.17B (SETTING INFORMATION FOR IMAGE FORMING APPARATUS 1c)

```
SETTING INFORMATION "0325.txt"
DATE/TIME: 2010-03-25T05:00:19+0900
BACKUP SOURCE: ABC001

SETTING PARAMETER 1 : xxx
SETTING PARAMETER 2 : xxx
SETTING PARAMETER 4 : xxx
SETTING PARAMETER 5 : xxx
```

IMAGE FORMING APPARATUS, BACKUP AND RESTORE PROCESSING METHOD

BACKGROUND OF THE INVENTION

1. Field of the Invention

The present invention relates to the technical field of image forming apparatuses and backup and restore processing methods.

2. Description of the Related Art

In recent years, there is generally known an image forming apparatus in which functions of devices such as a printer, a copier, a fax machine, and a scanner are accommodated in a single body. In this kind of multifunctional image forming apparatus, a display unit, a printing unit, and an image pickup unit are provided in a single body, and three kinds of applications corresponding to a printer, a copier, and a fax machine are provided. By switching the applications, the image forming apparatus operates as a printer, a copier, a scanner, or a fax machine.

As described above, as an increased number of functions are provided in an image forming apparatus, the number of items to be set in the image forming apparatus increases. A wide variety of items are usually manually set by a serviceman or an administrator, from an operation panel provided on the image forming apparatus or a Web screen of a PC (personal computer) connected to the image forming apparatus via a network. Specific examples of setting items are a "register program" storing setting modes that the user frequently uses with the device, "a fax address list", and selected values of various setting modes that are used at the time of activating the device (default settings).

Given such a background, when multiple image forming apparatus are installed in a customer's environment, and the serviceman has to manually set setting information (parameters) unique to the customer in each and every installed device, it is time consuming to install the devices, and operation errors may occur in the work.

There is known a technology of reading setting information set in a single image forming apparatus (backup), and writing the setting information in other image forming apparatuses (restore) (see, for example, patent document 1). The serviceman manually sets setting information unique to the customer in only one image forming apparatus. The same setting can be set for all image forming apparatuses simply by applying the setting information that has been set in the first device to the other image forming apparatus. Therefore, the work efficiency is significantly improved. There may be cases where the setting information (parameters) may be partially different in some of the image forming apparatuses. However, at least the common setting information (parameters) can be applied to all image forming apparatuses, and the serviceman only has to change part of the setting information (parameters). Therefore, the work efficiency is significantly improved in this case also.

Furthermore, it is also useful to save the setting information for recovery purposes when a failure occurs in the image forming apparatus. When the image forming apparatus breaks down due to a failure, by applying the setting information that has been read from the device, the original setting state can be quickly recovered.

The setting information can be acquired by using a storage medium such as a USB memory or a management terminal connected by a network.

For example, when using a USB memory, the serviceman connects a USB memory to the image forming apparatus for which settings have been completed, and saves the setting information in the USB memory to acquire the setting information. When writing (restoring) the setting information in another image forming apparatus, the USB memory is connected to another image forming apparatus, and the another image forming apparatus is caused to read the setting information.

Furthermore, when a management terminal is used, the serviceman operates the management terminal, and acquires setting information via the network from the image forming apparatus for which settings have been completed. When writing (restoring) the setting information in another image forming apparatus, the another image forming apparatus is caused to read the setting information via the network.

However, in the conventional technology, details of the result of executing backup/restore (successful/unsuccessful, the location of the failure and the reason when unsuccessful) are only displayed on the operation panel or the screen of the management terminal immediately after the execution. Therefore, when the user wants to collectively confirm the execution results of backup/restore performed for plural image forming apparatuses, or when the user wants to confirm the execution result of backup/restore on a later date, the user cannot confirm the execution results. This causes inconveniences in terms of managing the setting information.

Patent Document 1: Japanese Laid-Open Patent Publication No. 2007-128493

SUMMARY OF THE INVENTION

The present invention provides an image forming apparatus and a backup and restore processing method, in which one or more of the above-described disadvantages are eliminated.

A preferred embodiment of the present invention provides an image forming apparatus and a backup and restore processing method, by which processing results are output when a backup/restore process is performed on setting information for a device, so that convenience in managing devices is enhanced.

According to an aspect of the present invention, there is provided an image forming apparatus that operates according to setting information of the image forming apparatus, the image forming apparatus including a storage unit configured to store the setting information; an interface configured to connect a portable storage medium to the image forming apparatus; a first processing unit configured to read the setting information from the storage unit, write the setting information that has been read in the portable storage medium via the interface, read the setting information from the portable storage medium via the interface, and write the setting information that has been read in the storage unit; and a first log creating unit configured to create a first processing result log indicating a first processing result of a reading and writing process when the first processing unit reads the setting information from the storage unit and writes the setting information in the portable storage medium, and store the first processing result log in a predetermined storage location, and create a second processing result log indicating a second processing result of a reading and writing process when the first processing unit reads the setting information from the portable storage medium and writes the setting information in the storage unit, and store the second processing result log in the predetermined storage location.

According to an aspect of the present invention, there is provided a backup and restore processing method performed by an image forming apparatus that operates according to setting information of the image forming apparatus, the backup and restore processing method including a first processing step of reading the setting information from a storage unit, writing the setting information that has been read in a portable storage medium via an interface for connecting the portable storage medium to the image forming apparatus, reading the setting information from the portable storage medium via the interface, and writing the setting information that has been read in the storage unit; and a first log creating step of creating a first processing result log indicating a first processing result of a reading and writing process when the setting information is read from the storage unit and the setting information is written in the portable storage medium at the first processing step, and storing the first processing result log in a predetermined storage location, and creating a second processing result log indicating a second processing result of a reading and writing process when the setting information is read from the portable storage medium and the setting information is written in the storage unit at the first processing step, and storing the second processing result log in the predetermined storage location.

BRIEF DESCRIPTION OF THE DRAWINGS

Other objects, features and advantages of the present invention will become more apparent from the following detailed description when read in conjunction with the accompanying drawings, in which:

FIGS. 6A through 6D illustrate examples of a processing result log according to one embodiment;

FIG. 7 illustrates an example of a system management screen (part 1) according to one embodiment;

FIGS. 11A through 11C illustrate a progress status log according to modification 1;

FIGS. 17A and 17B illustrate examples of setting information after being edited according to modification 2.

DETAILED DESCRIPTION OF THE PREFERRED EMBODIMENTS

A description is given, with reference to the accompanying drawings, of embodiments of the present invention.

Embodiment

Functional Configuration

Figure 1:
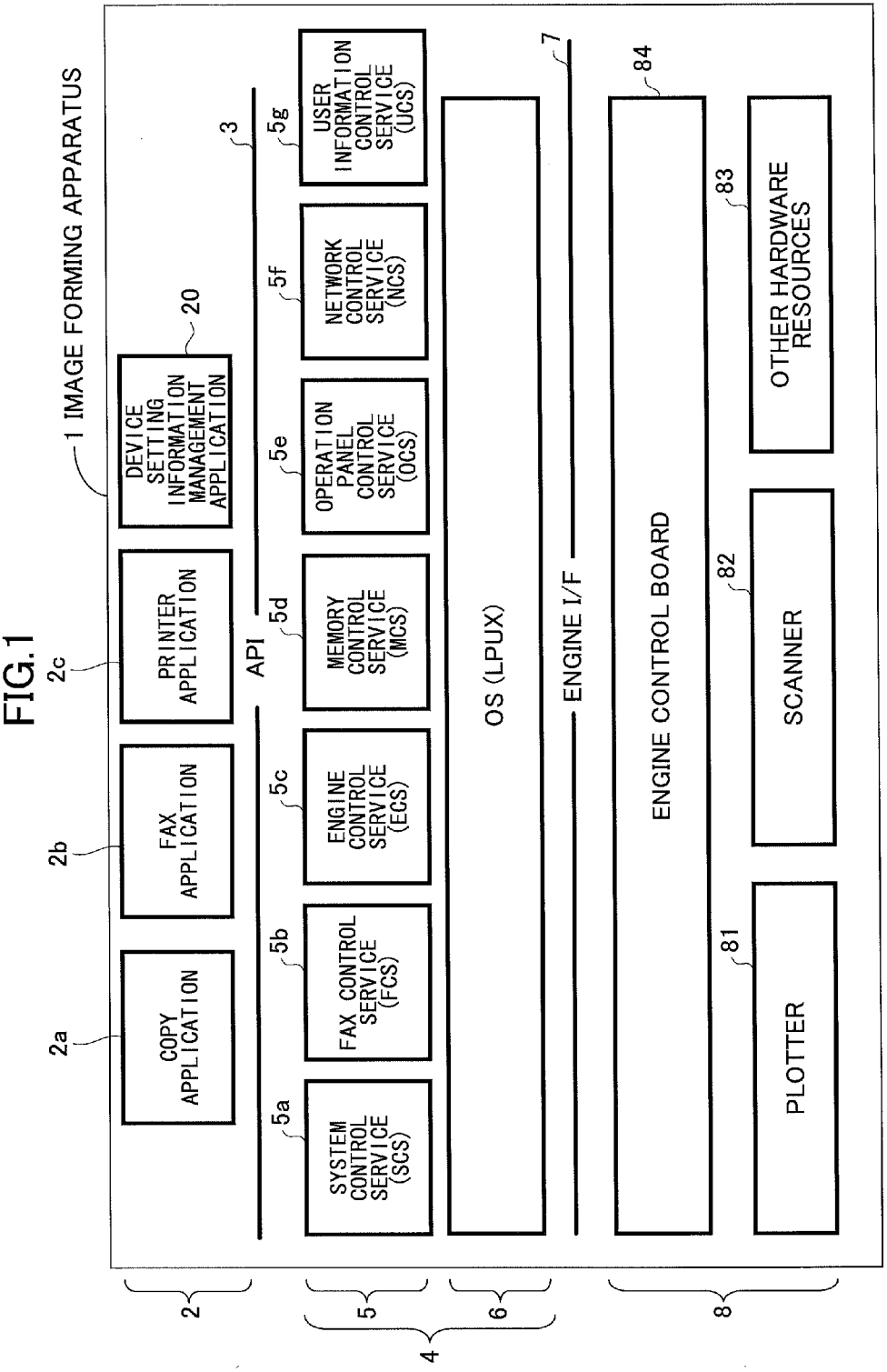
FIG. 1 is a functional block diagram of an image forming apparatus in which multiple image forming functions are combined according to one embodiment of the present invention.

FIG. 1 is a functional block diagram of an image forming apparatus in which multiple image forming functions are combined according to one embodiment of the present invention. In FIG. 1, an image forming apparatus 1 includes an application layer 2, a platform layer 4, and an engine unit 8. An interface 3 is an interface (API) provided to the application layer 2 by the platform layer 4. An interface 7 is an interface (engine I/F) between the platform layer 4 and the engine unit 8.

The application layer 2 is a software group for performing separate processes in the image forming apparatus 1. The application layer 2 includes a copy application 2a that is an application for a copier, a fax application 2b that is an application for a fax machine, a printer application 2c that is an application for a printer, and a device setting information management application 20 for managing the process of backing up the setting information of the image forming apparatus 1 in a portable external storage medium and restoring the setting information in the image forming apparatus 1.

The platform layer 4 is a software group for providing common service functions to the applications in the application layer 2 via the interface 3. The platform layer 4 includes a service layer 5 and an OS layer 6.

The service layer 5 includes a system control service (SCS) 5a having plural functions of managing applications, controlling the operation panel, displaying the system screen, displaying an LED, managing resources and controlling interruptions; a fax control service (FCS) 5b for providing API of a fax function; an engine control service (ECS) 5c for controlling the engine unit 8; a memory control service (MCS) 5d for controlling a memory; an operation panel control service (OCS) 5e for controlling an operation panel that is an interface with the user; a network control service (NCS) 5f for providing a service that can be commonly used by applications requiring network input/output; and a user information control service (UCS) 5g for managing user authority information.

Meanwhile, the engine unit 8 includes engines such as a plotter, 81, a scanner 82, and other hardware resources 83, and an engine control board 84 for controlling these engines.

Hardware Configuration

Figure 2:
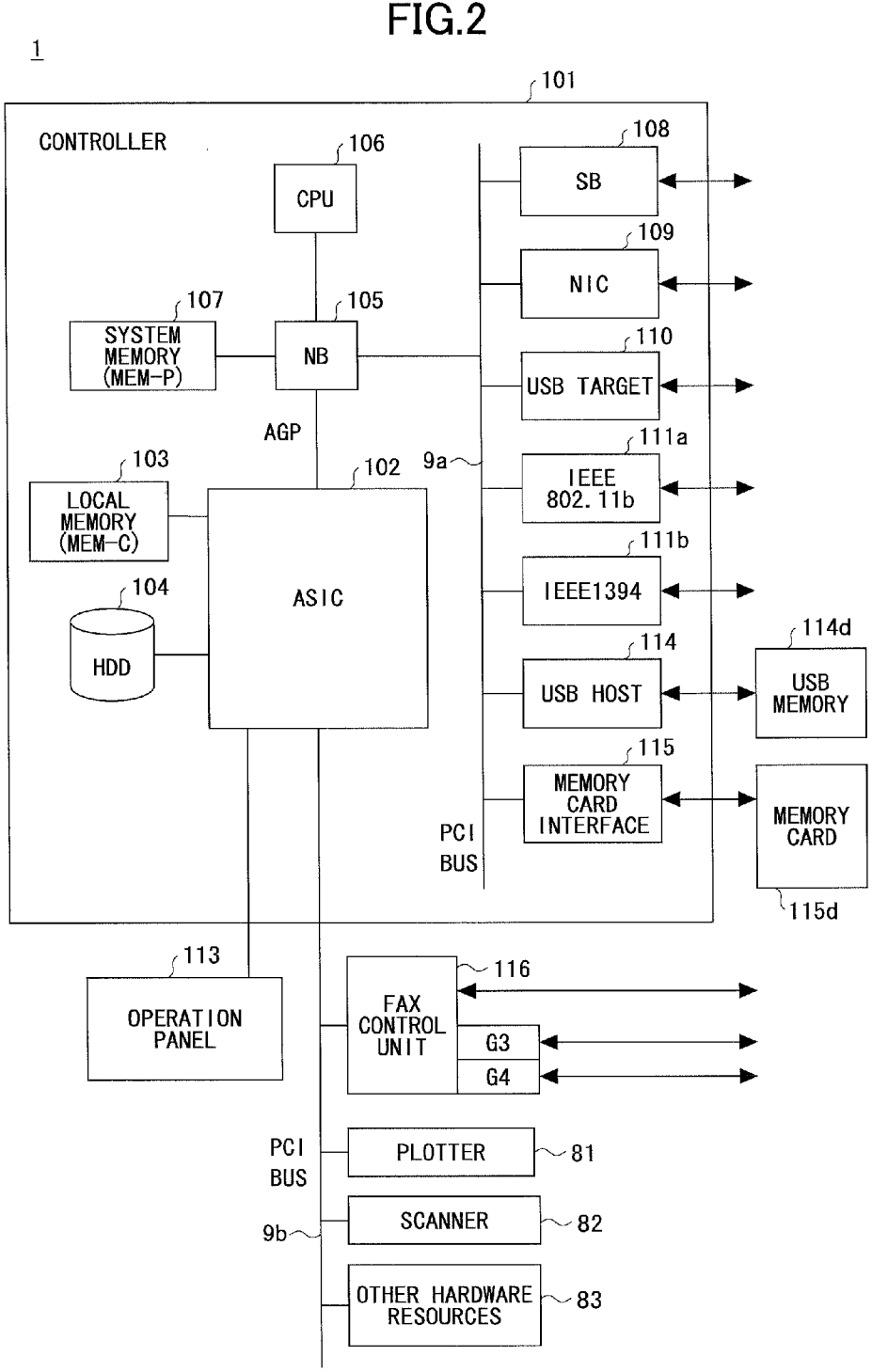
FIG. 2 is a block diagram indicating a hardware configuration of an image forming apparatus according to one embodiment.

FIG. 2 is a block diagram indicating a hardware configuration of the image forming apparatus according to the present embodiment. In FIG. 2, the image forming apparatus 1 includes an operation panel 113, a fax control unit 116, the plotter 81, the scanner 82, and the other hardware resources 83 connected to a controller 101 that performs the main control operations in the image forming apparatus 1.

A CPU 106 is connected to the controller 101. The CPU 106 is an IC for performing general control on ASIC 102 that is an IC for image processing, via a NB 105 that is a bridge.

A SB 108 that is a bridge for connecting peripheral devices, a USB (Universal Serial Bus) target 110 for taking in data by being handled as a USB disk, an IEEE802.11b 111a for providing an IEEE802.11b interface, an IEEE1394 111b for providing an IEEE1394 interface, a USB host 114 for enabling transmission/reception of high volume image data by being connected to the USB target (e.g., a USB memory 114d), and a memory card interface (I/F) 115 for performing input and output of programs and data between a memory card 115d such as an SD card (Secure Digital memory card), are connected to a PCI bus 9a of the NB 105.

To the ASIC 102, a local memory (MEM-C) 103 and a HDD (Hard Disk Drive) 104 are connected as storage devices. To the NB 105, a system memory (MEM-P) 107 is connected as a storage device.

In the following, a description is given of a process of controlling the operations of backing up setting information in a portable external storage medium and restoring setting information in the image forming apparatus 1 according to an embodiment of the present invention. In the diagrams referenced below, only the configurations and process flows relevant to the process according to an embodiment of the present invention are shown, and other configurations of the image forming apparatus 1 and other process flows are not shown.

Backup Process

Figure 3:
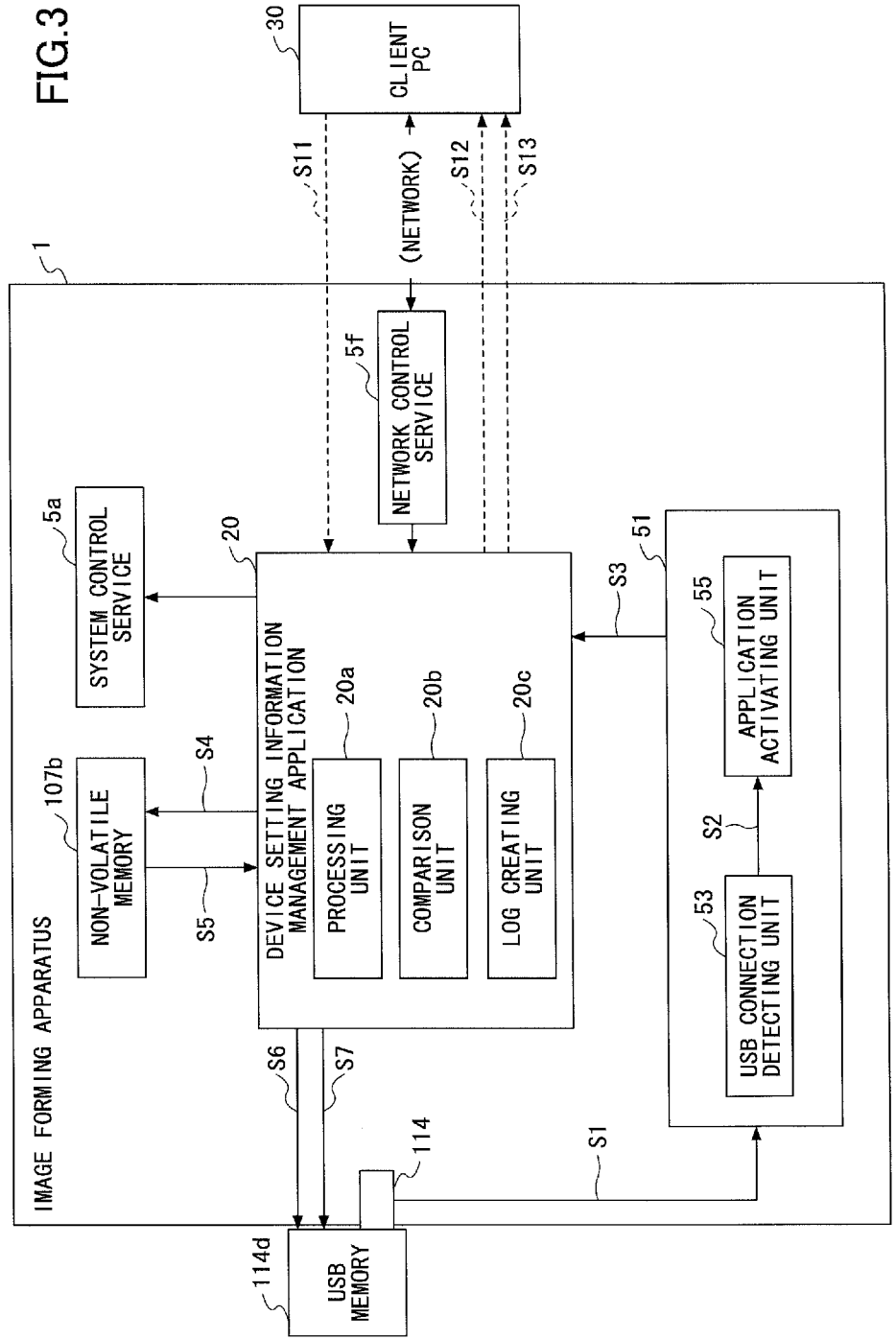
FIG. 3 illustrates a configuration of functions for implementing a backup process according to one embodiment.

FIG. 3 illustrates a configuration of functions for implementing a backup process according to the present embodiment. In FIG. 3, the image forming apparatus 1 (plural image forming apparatuses may be provided) and a client PC 30 are connected via a network. The setting information of the image forming apparatus 1 can be backed up in a USB memory 114d connected to itself, or can be backed up in the client PC 30 via the network.

Backup Process to USB Memory 114d

A description is given of a backup process in the USB memory 114d, as a function of the image forming apparatus 1. In FIG. 3, when the USB memory 114d is connected to the USB host 114 of the image forming apparatus 1 as a portable external storage medium, a USB connection detecting unit 53 of a usbhd (USB host daemon) 51 detects the connection (step S1), and reports to an application activating unit 55 in the usbhd 51 that the USB memory 114d has been connected (step S2). In response to the report of connection detection, the application activating unit 55 instructs activation to the device setting information management application 20 (step S3).

Figure 4:
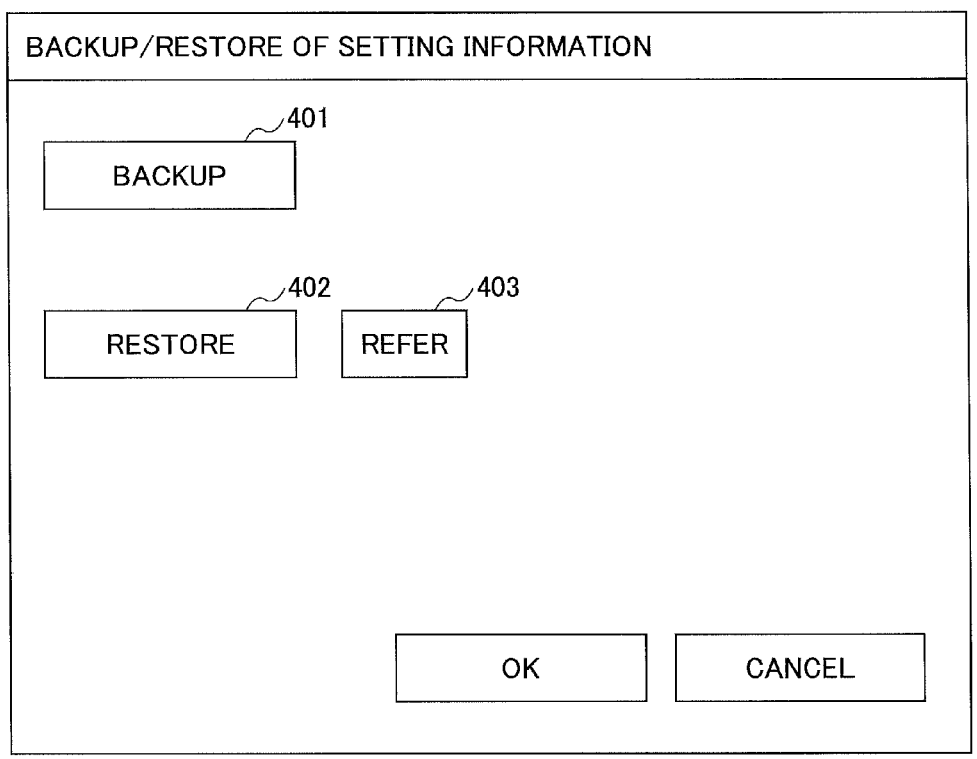
FIG. 4 illustrates an example of an operation screen according to one embodiment.

FIG. 4 illustrates an example of an operation screen according to the present embodiment. When the device setting information management application 20 is activated, an operation screen such as that of FIG. 4 is displayed on the operation panel of the image forming apparatus 1. The user can instruct "backup" 401 or "restore" 402 by operating this operation screen. The device setting information management application 20 checks the inside of the USB memory 114d, and when there is no setting information in the USB memory 114d, the device setting information management application 20 can automatically determine that this is a backup operation.

When backup is instructed, the device setting information management application 20 accesses a non-volatile memory 107b (step S4), and reads the setting information (device setting information) from the non-volatile memory 107b (step S5). Then, the setting information is written in the USB memory 114d (step S6).

Furthermore, when the device setting information management application 20 writes the setting information in the USB memory 114d, the device setting information management application 20 creates a processing result log in which the processing results are described, and writes the processing result log in the USB memory 114d (step S7).

In the present embodiment, when the device setting information management application 20 writes the processing result log in the USB memory 114d, the device setting information management application 20 sends the processing result log to the client PC 30 that is connected via the network (network control service (NCS) 5f) (for example, step S13). The client PC 30 acquires the processing result log from the device setting information management application 20 of the image forming apparatus 1 via the network, and saves the processing result log in a disk of the client PC 30.

The setting information that has been backed up in the USB memory 114d as described above can be subsequently restored by connecting the USB memory 114d to the image forming apparatus 1 that is the backup destination or another image forming apparatus 1. In the USB memory 114d, the processing result log is saved. The processing result log describes information relevant to the result of the backup (successful/unsuccessful) and the reason of the unsuccessful backup if the backup is unsuccessful. Therefore, by referring to the processing result log, a serviceman or an administrator can confirm the details of the backup process. A specific example of the processing result log is described below.

The USB memory 114d is a storage device which can be USB-connected according to the USB mass storage class. The usbhd 51 monitors devices connected to the USB host 114 by the USB connection detecting unit 53, and activates the device setting information management application 20 by the application activating unit 55.

The non-volatile memory 107b stores setting information (device setting information) set by a user via the operation panel 113 with various applications. The non-volatile memory 107b may be part of the storage area in the system memory 107 or part of the storage area in the HDD 104.

As described above, at the time of backup, the device setting information management application 20 acquires the setting information stored in the non-volatile memory 107b and writes the setting information in the USB memory 114d. Furthermore, with respect the to the writing process, the device setting information management application 20 creates a processing result log describing the processing results, and writes the processing results in the USB memory 114d (and also sends the processing results to the client PC 30).

The device setting information management application 20 includes a processing unit 20a, a comparison unit 20b, and a log creating unit 20c.

The processing unit 20a performs a backup/restore process of the setting information. In the case of a backup process, the processing unit 20a reads the setting information (device setting information) from the non-volatile memory 107b, and writes the setting information in the USB memory 114d. Furthermore, when backing up via the network, the processing unit 20a sends the setting information to the client PC 30 via the network control service 5f. Meanwhile, in the case of a restore process, the processing unit 20a reads the setting information from the USB memory 114d or receives the setting information from the client PC 30 via the network control service 5f in the case of restoring via the network, and writes the setting information in the non-volatile memory 107b.

The processing unit 20a may convert the setting information of the image forming apparatus 1 into a predetermined format, when writing the setting information in the USB memory 114d or sending the setting information to the client PC 30. For example, the setting information is converted into a shell-command format and the converted setting information is output. Accordingly, the client PC 30 can easily restore the setting information in one or more image forming apparatuses 1 at once, only by reading, from the USB memory 114d, the setting information that has been converted into the shell-command format and backed up, and sending the setting information to one or more image forming apparatuses 1 via the network.

The comparison unit 20b is for comparing the present setting information of the image forming apparatus 1 with the setting information that has already been backed up in the USB memory 114d, when backing up and restoring the setting information. The comparison result obtained by the comparison unit 20b is displayed on the operation panel 113, and the user can confirm the difference between the present setting information of the image forming apparatus 1 with the setting information in the USB memory 114d. A specific way of using this comparison result is to omit the backup/restore process when there is no difference.

The log creating unit 20c creates the processing result log that is the processing result of the processing unit 20a. For example, when the setting information is written in the USB memory 114d, the log creating unit 20c creates a processing result log in which the processing results are described, and writes the processing result log in the USB memory 114d (and sends the processing result log to the client PC 30). The processing result log describes information relevant to the result of the backup (successful/unsuccessful) in a predetermined format and the reason of the unsuccessful backup if the backup is unsuccessful. Therefore, a serviceman or administrator can confirm the details of the backup process by referring to the processing result log.

Backup Process to Client PC 30

Referring again to FIG. 3, a description is given of a backup operation performed from the client PC 30 via the network. The client PC 30 connects to the image forming apparatus 1 via the network in response to a user's instruction, and sends a backup request to the image forming apparatus 1 (step S11). Then, the device setting information management application 20 is activated via the network control service 5f of the image forming apparatus 1. In the client PC 30, the same screen as that of, for example, FIG. 4 is displayed, and the user can instruct "backup" 401 or "restore" 402 from this screen.

When backup is instructed (when a backup request is received), the device setting information management application 20 (processing unit 20a) accesses the non-volatile memory 107b (step S4), and reads the setting information (device setting information) from the non-volatile memory 107b (step S5). Then, the device setting information management application 20 sends the setting information of the image forming apparatus 1 to the client PC 30 via the network (step S12). That is to say, the client PC 30 acquires the setting information from the device setting information management application 20 of the image forming apparatus 1 via the network, and backs up the setting information in a disk of the client PC 30.

Furthermore, when the device setting information management application 20 sends the setting information to the client PC 30, the device setting information management application 20 (log creating unit 20c) creates a processing result log describing the processing results, and sends the processing result log to the client PC 30 via the network (step S13). The client PC 30 acquires the processing result log from the device setting information management application 20 of the image forming apparatus 1 via the network, and saves the processing result log in a disk of the client PC 30.

Restore Process

Figure 5:
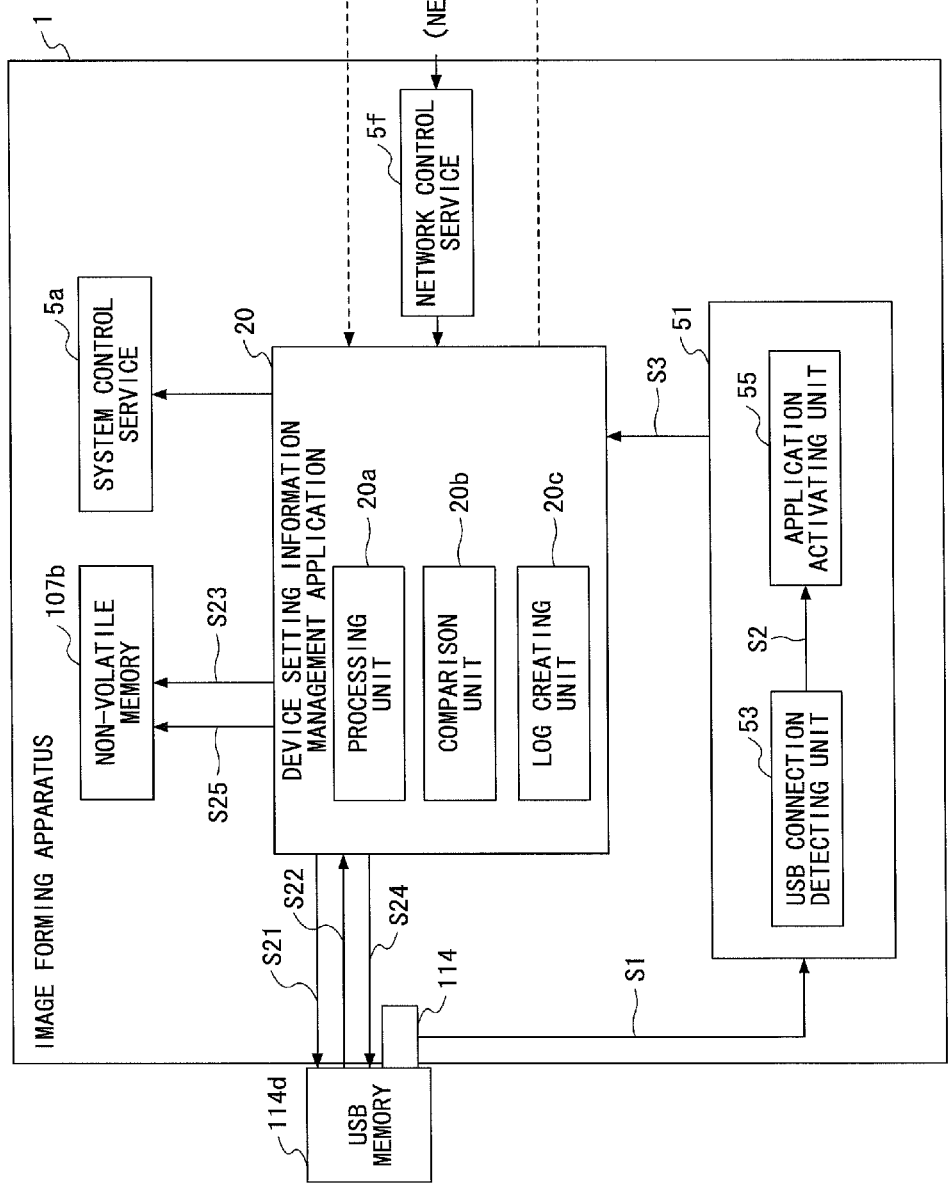
FIG. 5 illustrates a configuration of functions for implementing a restore process according to one embodiment.

FIG. 5 illustrates a configuration of functions for implementing a restore process according to the present embodiment. In FIG. 5, the image forming apparatus 1 (plural image forming apparatuses may be provided) and a client PC 30 are connected via a network. The setting information of the image forming apparatus 1 can be restored from the USB memory 114d connected to itself, or can be restored from the client PC 30 via the network.

Restore Process from USB Memory 114d

A description is given of restoring the setting information stored in the USB memory 114d to a single image forming apparatus 1. The user inserts the USB memory 114d in the image forming apparatus 1, and restores the setting information stored in the USB memory 114d in the image forming apparatus 1.

In FIG. 5, when the USB memory 114d is connected to the USB host 114 of the image forming apparatus 1 as a portable external storage medium, a USB connection detecting unit 53 of a usbhd 51 detects the connection (step S1), and reports to the application activating unit 55 in the usbhd 51 that the USB memory 114d has been connected (step S2). In response to the report of connection detection, the application activating unit 55 instructs activation to the device setting information management application 20 (step S3).

On the operation panel of the image forming apparatus 1, the operation screen of FIG. 4 described above is displayed. When the user instructs restore, the user selects setting information in the USB memory 114d that is to be applied, from "refer" 403. When the device setting information management application 20 checks the inside of the USB memory 114d, and setting information to be applied can be identified (for example, when there is only one setting information item or when there is the latest setting information), the device setting information management application 20 can automatically determine that the identified setting information is to be restored.

When restore is instructed, the device setting information management application 20 (processing unit 20a) accesses the USB memory 114d (step S21), and reads the setting information (device setting information) to be applied from the USB memory 114d (step S22). Then, the device setting information management application 20 (processing unit 20a) accesses the non-volatile memory 107b, and writes the setting information (device setting information) in the non-volatile memory 107b (step S23).

Furthermore, when the device setting information management application 20 reads the setting information from the USB memory 114d, and writes the setting information in the non-volatile memory 107b, the device setting information management application 20 (log creating unit 20c) creates a processing result log describing the processing results, and writes the processing result log in the USB memory 114d (step S24).

In the present embodiment, when the device setting information management application 20 writes the processing result log in the USB memory 114d, the device setting information management application 20 also sends the processing result log to the client PC 30 connected via the network (for example, step S32). The client PC 30 acquires the processing result log via the network from the device setting information management application 20 of the image forming apparatus 1, and saves the processing result log in the disk of the client PC 30.

Restore Process from Client PC 30

Referring again to FIG. 5, a description is given of a restore operation performed from the client PC 30 via the network. The client PC 30 connects to the image forming apparatus 1 via the network in response to a user's instruction, and sends a restore request to the image forming apparatus 1 (step S31). Then, the device setting information management application 20 is activated via the network control service 5f of the image forming apparatus 1. In the client PC 30, the same screen as that of, for example, FIG. 4 is displayed, and when the user instructs restore, the user selects setting information to be applied from "refer"403.

When restore is instructed (when a restore request including setting information is received), the device setting information management application (processing unit 20a) accesses the non-volatile memory 107b (step S23), and writes the setting information (device setting information) included in the restore request in the non-volatile memory 107b (step S25).

Furthermore, when the device setting information management application 20 writes the received setting information in the non-volatile memory 107b, the device setting information management application 20 (log creating unit 20c) creates a processing result log describing the processing results, and sends the processing result log to the client PC 30 via the network (step S32).

Example of Processing Result Log

FIGS. 6A through 6D illustrate examples of the processing result log according to the present embodiment. As illustrated in FIGS. 6A through 6D, the processing result log has, for example, a predetermined text format. Every time a backup process or a restore process is executed, one log file is created and stored in the USB memory 114d or the client PC 30. In the following, a description is given of log items saved in the processing result log.

"Date/time" indicates the date/time when backup or restore is executed. For example, Mar. 25, 2010, 15 hours 16 minutes 53 seconds (GMT+9:00) is recorded as "2010-03-25T15:16:53+0900". The date/time that the log creating unit 20c acquires from the system control service 5a is recorded as the value of the date/time.

"Process type" indicates whether the executed process is backup or restore. For example, in the case of restore, "IMPORT" is recorded, and in the base of backup, "EXPORT" is recorded.

"Processing result" indicates the result of the process of executing backup/restore. For example, when the executed process is successful, "SUCCESS" is recorded. Meanwhile, when the executed process is unsuccessful, the specific reason why the process is unsuccessful is recorded, such as the following.

"BUSY": restore or backup is already being executed
"MODULE ERROR": an error by which the process cannot be continued has occurred inside the device
"DISK FULL": capacity shortage in write destination
"DEVICE ERROR": writing/reading is unsuccessful
"PART FAILED": there is item for which restore is unsuccessful
"INVALID FILE": restore target file is fraudulent In the case of backup (EXPORT), the setting information indicates a file name of the setting information that has been backed up. In the case of restore (IMPORT), the setting information indicates a file name of the setting information that has been restored.

"Device ID" indicates a unique ID value for identifying the device, which is saved in a non-volatile manner inside the image forming apparatus 1. The administrator sets a unique value as each unique ID value and saves the ID value in the non-volatile memory 107b. When backup/restore is performed, the unique ID value is acquired and recorded.

"IP address" is an IP address that is set for the device, which is saved in a non-volatile manner inside the image forming apparatus 1. An IP address that has been assigned by an administrator is saved in the non-volatile memory 107b. When backup/restore is performed, the IP address is acquired and recorded.

"Installation location" indicates information relevant to the location (position) of the device, which is saved in a non-volatile manner inside the image forming apparatus 1. An administrator sets a unique character string as the installation location for each device and sets the installation location in the non-volatile memory 107b. When backup/restore is performed, the installation location is acquired and recorded.

"Device model" indicates information relevant to the model name of the image forming apparatus 1. The device model is set/saved in a storage area of the non-volatile memory 107b where the user cannot set/change, when the device shipped from the factory. When backup/restore is performed, the device model is acquired and recorded.

"Storage location of device setting information" indicates information relevant to the location where the setting information is stored at the time of the backup/restore process. For example, when backup or restore is performed by using the USB memory 114d, "USB" is recorded. Meanwhile, when backup or restore is performed by using the client PC (IP address: 192.168.1.200) from the network, "192.168.1.200" is recorded. In this case, an IP address of a terminal identifying the client PC 30 that is a network terminal is indicated.

FIGS. 6A through 6D indicate examples of processing result logs of different patterns, which are created when the backup/restore process is successful. When the backup/restore process is unsuccessful, a value indicating the reason why the process was unsuccessful is recorded at the "processing result" instead of SUCCESS.

FIG. 6A is a processing result log that is created when the setting information (0325.txt) is backed up (EXPORT) from the image forming apparatus to the USB memory, and is saved in the USB memory (and client PC). "Processing result" indicates SUCCESS, which means that the setting information (0325.txt) has been normally saved in the USB memory.

FIG. 6B is a processing result log that is created when the setting information (0325.txt) is backed up (EXPORT) from the image forming apparatus to the client PC, and is saved in the client PC. "Processing result" indicates SUCCESS, which means that the setting information (0325.txt) has been normally saved in the client PC.

FIG. 6C is a processing result log that is created when the setting information (0325.txt) is restored (IMPORT) from the USB memory to the image forming apparatus, and is saved in the USB memory (and client PC). "Processing result" indicates SUCCESS, which means that the setting information (0325.txt) has been normally restored in the image forming apparatus.

FIG. 6D is a processing result log that is created when the setting information (0325.txt) is restored (IMPORT) from the client PC (192.168.1.200) to the image forming apparatus, and is saved in the client PC. "Processing result" indicates SUCCESS, which means that the setting information (0325.txt) has been normally restored in the image forming apparatus.

Example of System Management Screen

FIG. 7 illustrates an example of a system management screen (part 1) according to the present embodiment. The client PC 30 includes a management tool for managing processing result logs, and the administrator can collectively display the processing result logs and confirm details with the use of the management tool.

When the USB memory 114d is connected, the management tool not only acquires the processing result logs stored in the local disk of the client PC 30, but also the processing result logs stored in the USB memory 114d, compiles the processing result logs, and collectively displays the processing result logs.

In the system management screen, the administrator specifies the search target range from the USB memory 114d and/or the local disk, and inputs "search condition" to extract the desired processing result log. For example, as shown in FIG. 7, when the "period" (for example, 2010-03-25) is input as the search key, a list of processing result logs extracted based on the value of "date/time" of the processing result log is displayed.

Figure 8:
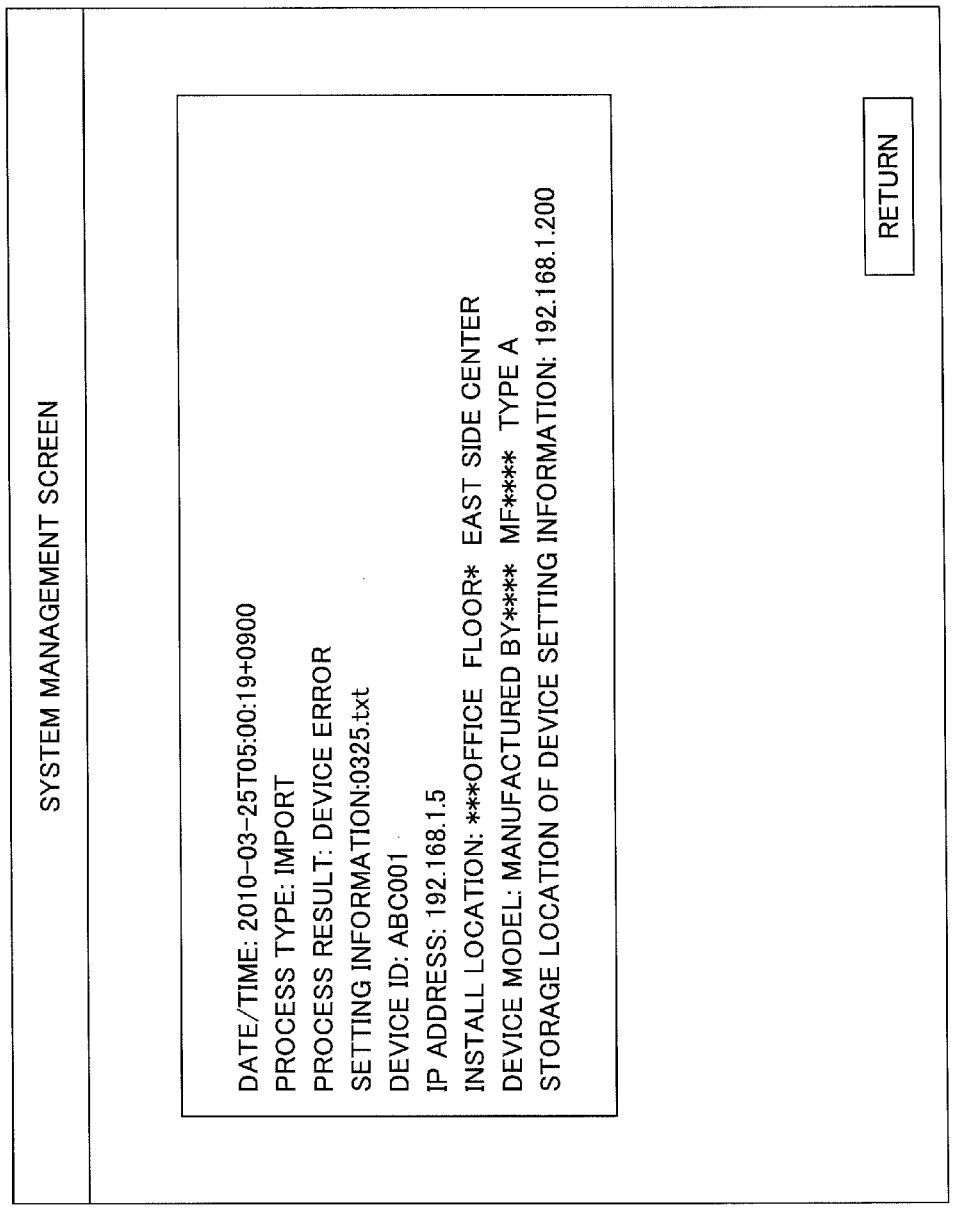
FIG. 8 illustrates an example of a system management screen (part 2) according to one embodiment.

FIG. 8 illustrates an example of a system management screen (part 2) according to the present embodiment. When the administrator wants to confirm further details about a processing result log included in the list of processing result logs, the administrator selects one of the processing result logs in the list of FIG. 7, and presses "confirm details" so that the screen changes to the screen of FIG. 8. The screen of FIG. 8 displays details of the selected processing result log. The details of the processing result log displayed in FIG. 8 correspond to the processing result log of FIGS. 6A through 6D.

Example of System Management

An example of system management using the processing result log according to the present embodiment is described below. In the following example of management operation, it is assumed that there is both an administrator A on the floor side residing at the location where the device is physically installed, and an administrator B on the network side managing the system via the network.

For example, in a system configuration according to an embodiment of the present invention, the setting information stored in the client PC 30 can be collectively and automatically backed up and restored in plural image forming apparatuses 1 connected to a network. However, there may be cases where the backup/restore process is unsuccessful only in a particular image forming apparatus for some reason.

When backup/restore is collectively executed automatically, it is difficult for the administrator on the network side to know the state of all devices that are backup/restore targets beforehand (particularly when the administrator is physically far away from the restore target devices). Therefore, after the backup/restore is completed, the administrator on the network side refers to all processing result logs of the automatic backup/restore saved in the client PC 30. Accordingly, it is possible to confirm whether the automatic restoring is successful via the network, without having the administrator on the floor side check each of the image forming apparatus to confirm whether the execution is successfully completed. Furthermore, it is easy to know whether the backup/restore process has been unsuccessful for a particular image forming apparatus, and therefore the administrator can quickly handle the failure.

For example, referring again to FIG. 7, in the system management screen of the client PC 30, for "device ID": ABC0005, "processing result": DEVICE ERROR is indicated, and therefore it can be easily known that the backup process has been unsuccessful.

Furthermore, for example, in the system configuration according to an embodiment of the present invention, setting information can be backed up in the USB memory 114d connected to the image forming apparatus 1, and conversely, setting information can be restored from the USB memory 114d. The backup/restore using USB can be directly executed by the administrator on the floor side from the image forming apparatus 1. Therefore, there may be cases where the backup/restore executed by the administrator on the floor side competes with the management of setting information by the administrator on the network side, i.e., with the automatic backup/restore executed by the administrator on the network side.

However, in a case where the administrator on the floor side executes backup/restore of the setting information from the device, the device setting information management application 20 sends (transfers) the processing result log also to the client PC 30 via the network. Therefore, the administrator on the network side can recognize that a backup/restore process that is not managed by himself has been executed. Accordingly, when plural administrators residing at physically separate locations are both managing backup/restore of setting information, the management contents can be known and shared between each other.

For example, referring again to FIG. 7, in the system management screen of the client PC 30, at the "device ID": ABC0001, at "time/date": 2010-03-25T05:00:00+0900, backup has been performed, and at "time/date": 2010-03-25T15:16:53+0900, restore has been performed. Assuming that the former backup process has been done by the administrator on the network side on a regular basis, it can be easily understood that the latter restore process has been done from USB by the administrator on the floor side due to some reason. In this case, the latest setting information (at the time point of 15:16:53) is stored in USB (the setting information (at the time point of 05:00:00) stored in the client PC 30 is not the latest version), and therefore the administrator on the network side can contact the administrator on the floor side and quickly confirm the purpose of the restore process and acquire the latest setting information. This latest setting information is required for performing the next restore process performed by the administrator on the network side.

Modification 1

Next, a description is given of modification 1.

Functional Configuration Relevant to Image Formation

Figure 9:
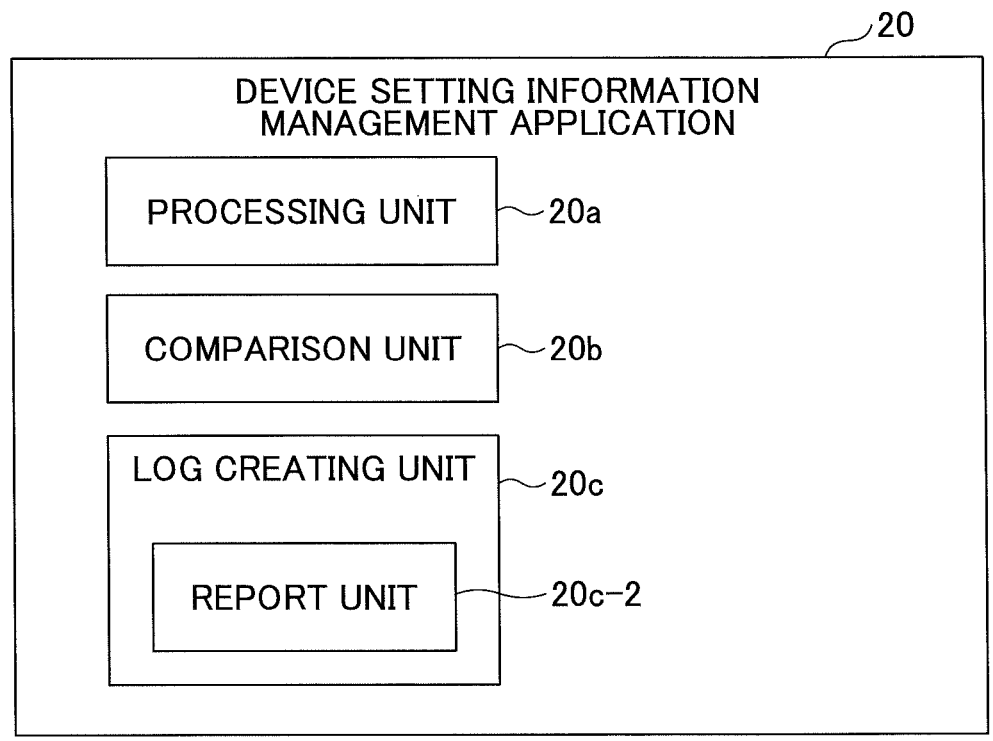
FIG. 9 is a functional block diagram of a device setting information management application of an image forming apparatus according to modification 1.

FIG. 9 is a functional block diagram of the device setting information management application 20 of the image forming apparatus 1 according to modification 1. Compared to FIG. 3, the log creating unit 20c of the device setting information management application 20 according to the present modification includes a report unit 20c-2.

As described above, the log creating unit 20c creates a processing result log that is the processing result (for example, the backup/restore processing result) of the processing unit 20a. For example, when setting information is written in the USB memory 114d in a backup process, the log creating unit 20c creates a processing result log describing the processing results, and writes the processing result log in the USB memory 114d.

The report unit 20c-2 reports a progress status log indicating the progress status of the process (for example, the backup/restore process) of the processing unit 20a to the administrator at timings when progress is made. The processing result log itself is a process completion result of the processing unit 20a, while a progress status log is an intermediate process result of the processing unit 20a. Specific examples of the progress status are the progress status at the time when the process of the processing unit 20a has started, the progress status when 50% of the process has been completed, and the progress status when 100% of the process has been completed.

Figure 10:
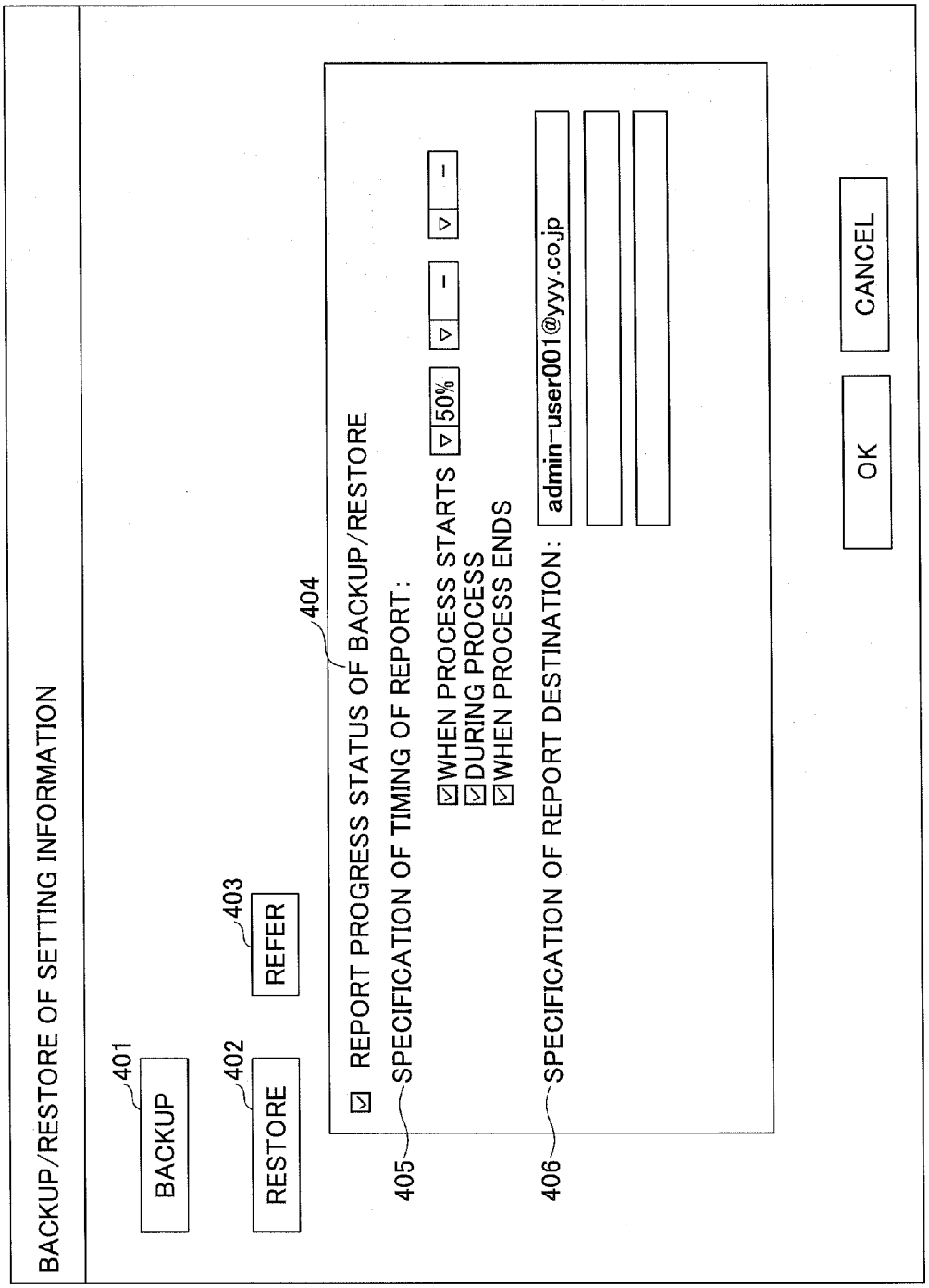
FIG. 10 illustrates an example of an operation screen according to modification 1.

FIG. 10 illustrates an example of an operation screen according to the present modification. As described above, when the device setting information management application 20 is activated, on the operation panel of to the image forming apparatus 1, an operation screen such as that of FIG. 10 is displayed. The user can operate this operation screen to instruct "backup" 401 or "restore" 402.

In the operation screen example according to the present modification, when performing backup/restore, the user can specify an option of "report progress status of backup/restore" 404. The user ticks the box of "report progress status of backup/restore" 404, and then specifies "specification of timing of report" 405. This is for specifying the timing of reporting the progress status. For example, the timing of reporting the progress status can be specified as "when process starts", "during process" (specify %), and "when process ends". "Specification of report destination" 406 is for specifying the destination to which the progress status is reported, such as a mail address. Plural report destinations may be specified. For example, the mail addresses of an administrator and a serviceman are input and specified.

"Specification of timing of report" 405 may be set for each "specification of report destination". For example, for a certain destination, the "specification of timing of report" 405 may be only "when process starts", for another destination, the "specification of timing of report" 405 may be "when process starts" and "when process ends", and for yet another destination, "specification of timing of report" 405 may be "when process starts", "during process" (specify %), and "when process ends". Thus, the timing of the report can be flexibly set according to requirements of the report destination.

Example of Progress Status Log

Figure 11B:
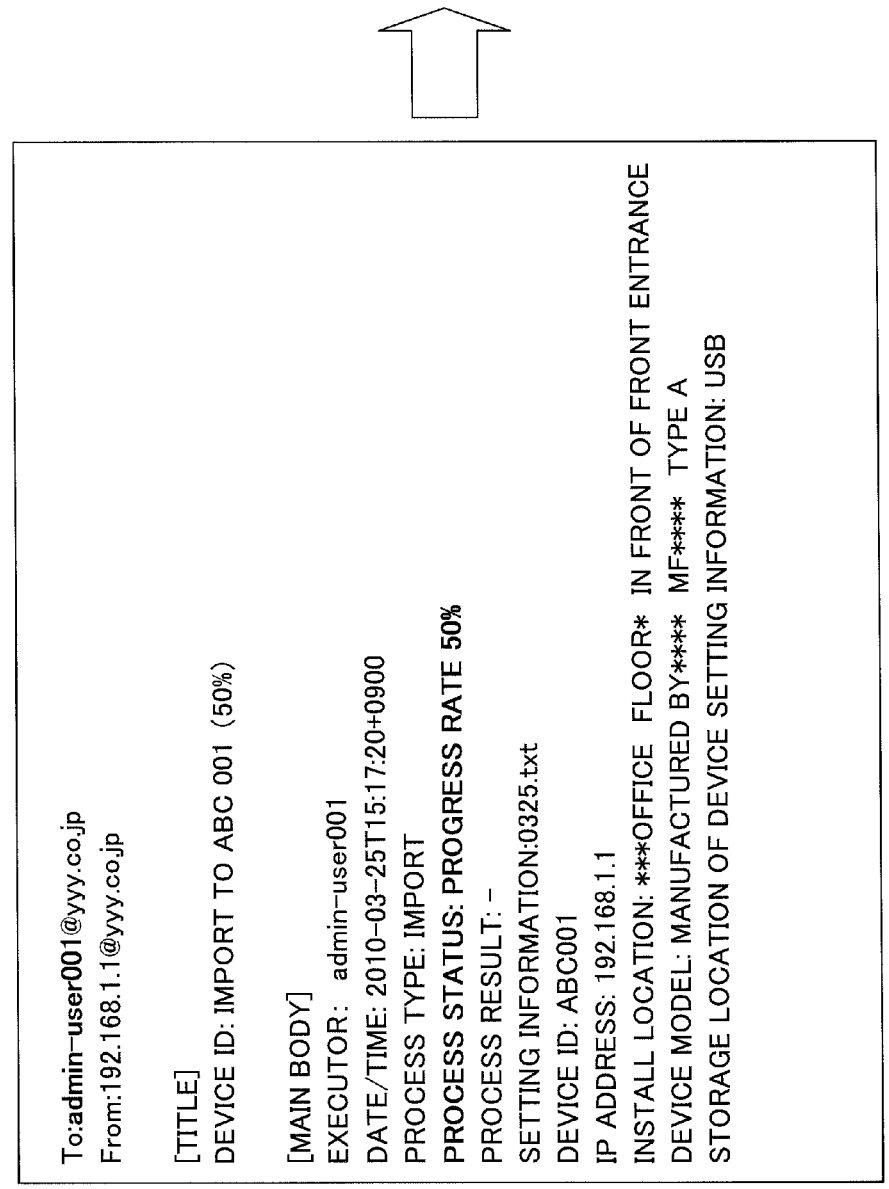

FIGS. 11A through 11C illustrate a progress status log according to the present modification. As illustrated in FIGS. 11A through 11C, in the progress status log, the setting information (0325.txt) of the USB memory is used to report the progress status of a restore process to the image forming apparatus 1 (ABC001). The progress status log is, for example, in a predetermined text format.

As backup or restore is executed, the report unit 20c-2 creates a progress status log that is an intermediate process result of the processing unit 20a, and reports the progress status log to the specified report destination ("specification of report destination") according to the report timing ("specification of timing of report" 405) specified in the operation screen. In FIGS. 11A through 11C, the "specification of timing of report" is specified as "when process starts", "during process" (specified as 50%), and "when process ends", and therefore the progress status of the backup/restore process (for example, mail) is reported at the timings of "when process starts", "during process" (specified as 50%), and "when process ends".

The contents of the progress status log indicate contents of the operation process (for example, a backup/restore process) of the processing unit 20a, and are thus substantially the same as those of FIGS. 6A through 6D.

"To" indicates the specified report destination ("specification of report destination"). For example, the report destinations are the mail addresses of an administrator and a serviceman.

"From" indicates the report source. For example, the report source is the mail address assigned to the image forming apparatus 1. Depending on the mail environment, the report source may be a mail address of the management system.

"Executor" indicates the executor of the backup/restore process. When operating the image forming apparatus 1, it is necessary to first log in, and therefore the executor is, for example, the log-in user. Furthermore, the log-in user may be the administrator or the serviceman.

"Process status" is the progress status of the backup/restore process. For example, the progress status is "when process starts", "during process" (specify %), and "when process ends". Accordingly, the administrator or the serviceman that has received the progress status log can constantly recognize the present progress status of the backup/restore process.

As described above, according to the present modification, a progress status log indicating the progress status of the process of the processing unit 20a (for example, backup/restore process) can be reported to the administrator at timings when progress is made. The processing result log itself is a process completion result of the processing unit 20a, and therefore the log can be supplemented by a progress status log indicating the intermediate process status of the processing unit 20a.

Example of System Management

An example of system management using the progress status log according to the present modification is described below. In the following example of system management, it is assumed that there is both an administrator A on the floor side residing at the location where the device is physically installed, and an administrator B on the network side managing the system via the network.

(1) Prevention of Erroneous Operation of Multiple Execution

In a conventional backup/restore process, when plural administrators are managing a device, for example, while an administrator A is executing backup/restore, another administrator B may execute backup/restore. As a result of this multiple execution, there have been cases where the backup/restore process is unsuccessful.

According to the present modification, when execution of the backup/restore process starts, it is reported to arbitrary users and administrators that the process has started. Therefore, by registering the person authorized to execute backup/restore (authorized person) at the report destinations, the other administrator B can recognize that the administrator A who is an authorized person is executing a backup/restore process. Thus, multiple execution can be prevented.

(2) Prevention of Erroneous Operation of Overwriting by Restore Process

In a conventional restore process, when plural administrators are managing a device, for example, when an administrator A has performed restore on a device to rewrite setting information for a certain reason, an administrator B who is not aware of this may perform restore on the same device and overwrite the settings made by the administrator A.

According to the present modification, when execution of the restore process starts, it is reported to arbitrary users and administrators that the process has started. Therefore, by registering the person authorized to execute backup/restore (authorized person) at the report destinations, the other administrator B can recognize that the administrator A who is an authorized person has already completed a restore process on a device. Thus, it is possible to prevent setting information, which has already been set in a restore process executed by another administrator, from being overwritten by other setting information.

(3) Prevention of Fraudulent Execution

According to the present modification, when execution of the backup/restore process starts, it is reported to arbitrary users and administrators that the process has started. Therefore, by registering the person authorized to execute backup/restore (authorized person) at the report destinations, even if someone fraudulently executes backup/restore, by referring to information in the report, the administrator can recognize the executor and the setting information that is the target of backup/restore. Thus, fraudulent execution can be prevented, and the original state of the device can be quickly restored.

Modification 2

Next, a description is given of modification 2.

Functional Configuration Relevant to Image Formation

Figure 12:
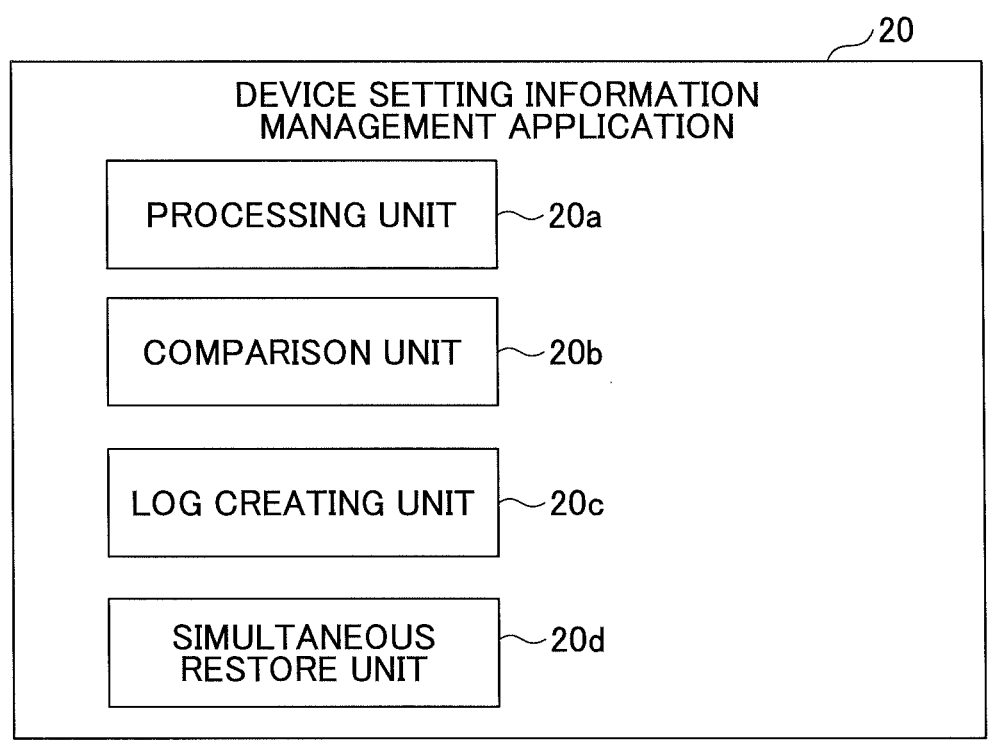
FIG. 12 is a functional block diagram of a device setting information management application of an image forming apparatus according to modification 2.

FIG. 12 is a functional block diagram of the device setting information management application 20 of the image forming apparatus 1 according to modification 2. Compared to FIG. 3, the device setting information management application 20 according to the present modification includes a simultaneous restore unit 20d.

When the processing unit 20a performs a backup/restore process on the setting information of the own device, the simultaneous restore unit 20d transfers the same setting information to another specified device, so that the same process is executed.

As described above, when a restore process is executed on the image forming apparatus 1, a serviceman inserts a USB memory to the target device and inputs operations from the operation panel, or executes the restore process via the client PC 30. However, when there are plural target devices, the serviceman has to perform the restore operation on each and every one of the target devices.

In modification 2, the simultaneous restore unit 20d transfers the same setting information to other specified devices, so that the same process is executed. Accordingly, the user only has to execute the restore process on one device; the restore process can be efficiently executed on the other devices at the same time by using the same setting information.

Figure 13:
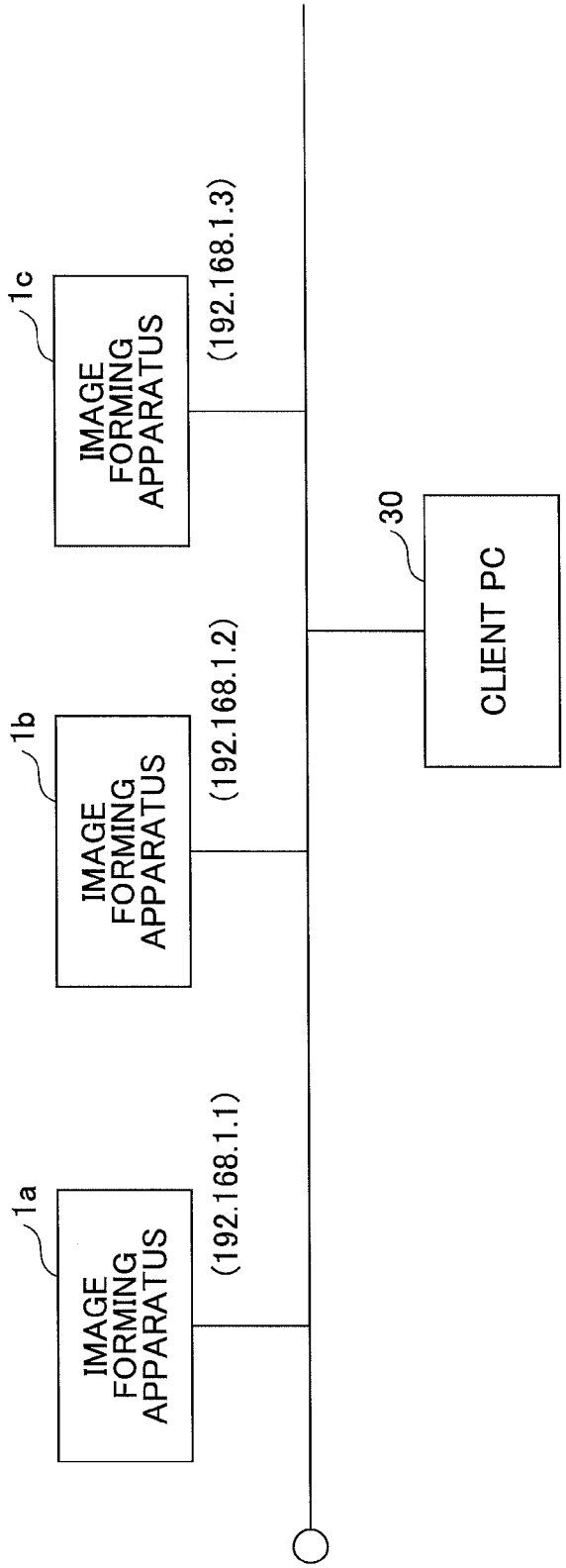
FIG. 13 illustrates a network configuration including an image forming apparatus according to modification 2.

FIG. 13 illustrates a network configuration including the image forming apparatus 1 according to the present modification. As shown in FIG. 13, plural image forming apparatuses 1 are connected via a network.

In the present modification, the user executes a restore process on an image forming apparatus 1a. Specifically, the user inserts a USB memory in the image forming apparatus 1a that is a restore target and inputs operations from the operation panel or executes the restore process via the client PC 30.

Next, the simultaneous restore unit 20d of the image forming apparatus 1a transfers the same setting information to other specified devices (for example, image forming apparatus 1b and image forming apparatus 1c), and executes the same process. The user only has to execute the restore process on one image forming apparatus 1a; the restore process can be efficiently executed on the other devices at the same time by using the same setting information.

Figure 14:
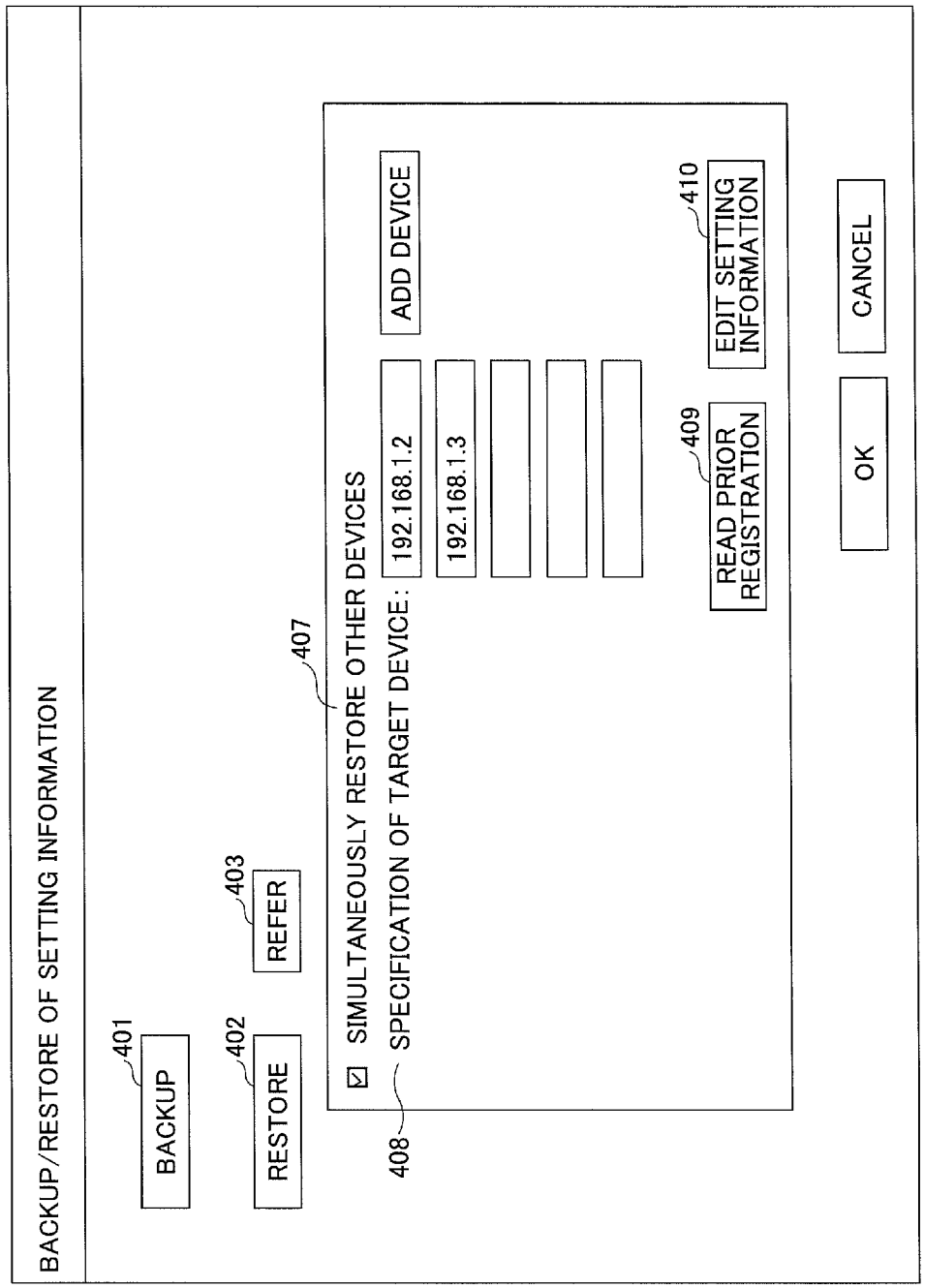
FIG. 14 illustrates an example of an operation screen according to modification 2.

FIG. 14 illustrates an example of an operation screen according to the present modification. As described above, when the device setting information management application 20 is activated, an operation screen such as that of FIG. 14 is displayed on the operation panel of the image forming apparatus 1a. The user can instruct "backup" 401 or "restore" 402 by operating this operation screen.

In the operation screen according to the present modification, when performing restore, it is possible to specify an option of "simultaneously restore other devices" 407. First, the user ticks the box of "simultaneously restore other devices" 407, and then specifies "specification of target device" 408. This is to specify the other devices that are to be restore targets.

For example, another device to be a restore target can be specified by an IP address. Here, for example, "192.168.1.2" specifying the image forming apparatus 1b to be a restore target and "192.168.1.3" specifying the image forming apparatus 1c to be a restore target are input.

It is possible to collectively specify devices of a certain range by inputting "192.168.1.2" through "192.168.1.10" or to collectively specify all devices in the same subnet by inputting "192.168.1.0/24". If name resolution is possible, host names may be used to specify devices.

Furthermore, to eliminate the task of specifying devices every time, predetermined devices may be registered in advance. The devices registered in advance can be read from "read prior registration" 409 as illustrated in FIG. 14. Among the devices read from "read prior registration" 409, the other devices to be restore targets can be selected.

Example of Simultaneous Restore Process

Figure 15:
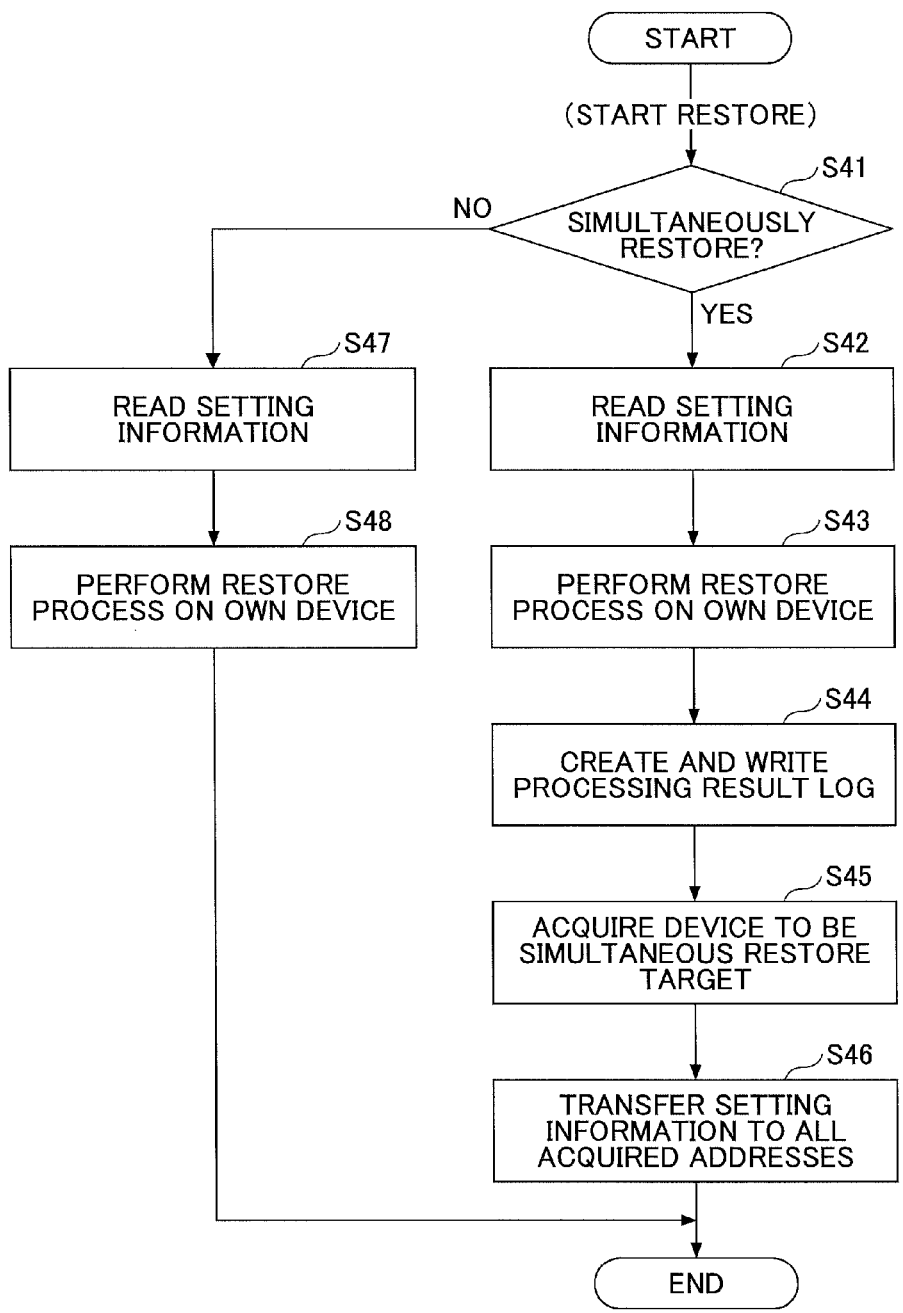
FIG. 15 is a flowchart describing a simultaneous restore process according to modification 2.

FIG. 15 is a flowchart describing a simultaneous restore process according to the present modification.

First, when restore is instructed, the device setting information management application 20 (processing unit 20a) determines whether simultaneous restore is to be performed (YES in step S41). Specifically, when "simultaneously restore other devices" 407 is ticked (see FIG. 14), it is determined that simultaneous restore is to be performed.

Next, the device setting information management application 20 (processing unit 20a) reads the setting information (step S42/step S22 of FIG. 5). Specifically, the setting information is read from the USB memory 114d or received from the client PC 30 as a restore request including the setting information.

The device setting information management application 20 (processing unit 20a) accesses the non-volatile memory 107b, and writes the setting information (device setting information) in the non-volatile memory 107b (step S43/step S23 of FIG. 5).

When the device setting information management application 20 reads the setting information from the USB memory 114d, and writes the setting information in the non-volatile memory 107b, the device setting information management application (log creating unit 20c) creates a processing result log describing the processing results, and writes the processing result log in the USB memory 114d (step S44/step S24 of FIG. 5). Procedures up to this step are as described above.

Next, the device setting information management application 20 (simultaneous restore unit 20d) acquires devices to be targets of simultaneous restore (step S45). Specifically, to acquire the IP addresses specified at "specification of target device" 408 (see FIG. 14), "192.168.1.2" specifying the image forming apparatus 1b and "192.168.1.3" specifying the image forming apparatus 1c are acquired.

The device setting information management application 20 (simultaneous restore unit 20d) transfers the setting information read at step S42 to all of the acquired addresses (step S46). More precisely, the device setting information management application 20 (simultaneous restore unit 20d) sends a restore request including the setting information. This restore request including the setting information is the same as that sent from the client PC 30 via the network (step S31 of FIG. 5). Accordingly, in the image forming apparatus 1b and image forming apparatus 1c that have received this restore request including the setting information, the device setting information management application 20 is activated by the network control service 5f as described above, and subsequently, a restore process is executed.

In the image forming apparatus 1b and image forming apparatus 1c that have received the restore request including the setting information, it is assumed that the USB memory 114d in which the processing result log is to be written is not inserted. Thus, in this case, the device setting information management application 20 (log creating unit 20c) of the image forming apparatus 1b and image forming apparatus 1c sends the processing result log created according to the processing results to the image forming apparatus 1a that is the restore request source (step S32 of FIG. 5). Then, the image forming apparatus 1a can collectively write the received progress status logs in the USB memory 114d.

The device setting information management application 20 (log creating unit 20c) of the image forming apparatus 1b and image forming apparatus 1c may send the processing result log created according to the processing results to the client PC 30 (step S32 of FIG. 5). The client PC 30 to which the processing result log is to be sent may be specified by including the IP address of the client PC 30 in the restore request.

Meanwhile, when it is determined that simultaneous restore is not to be performed (NO in step S41), the device setting information management application 20 (processing unit 20a) only executes the restore process in the own device. That is to say, the device setting information management application 20 (processing unit 20a) reads the setting information from the USB memory 114d, and writes the setting information in the non-volatile memory 107b (step S47). Furthermore, the device setting information management application 20 (log creating unit 20c) creates a processing result log describing the processing results, and writes the processing result log in the USB memory 114d (step S48).
Supplementary Note Referring again to FIG. 14, a description is given of "edit setting information" 410. In principle, when performing simultaneous restore on other devices, the same setting information is transferred to all devices that are restore targets, and as a result, the same setting information is applied to all devices that are restore targets.

However, there may be cases where only a certain parameter included in the setting information is to be applied to a particular device. That is to say, the "edit setting information" 410 is for exceptionally editing a setting item among the setting information that is principally transferred to all devices that are restore targets.

Figure 16:
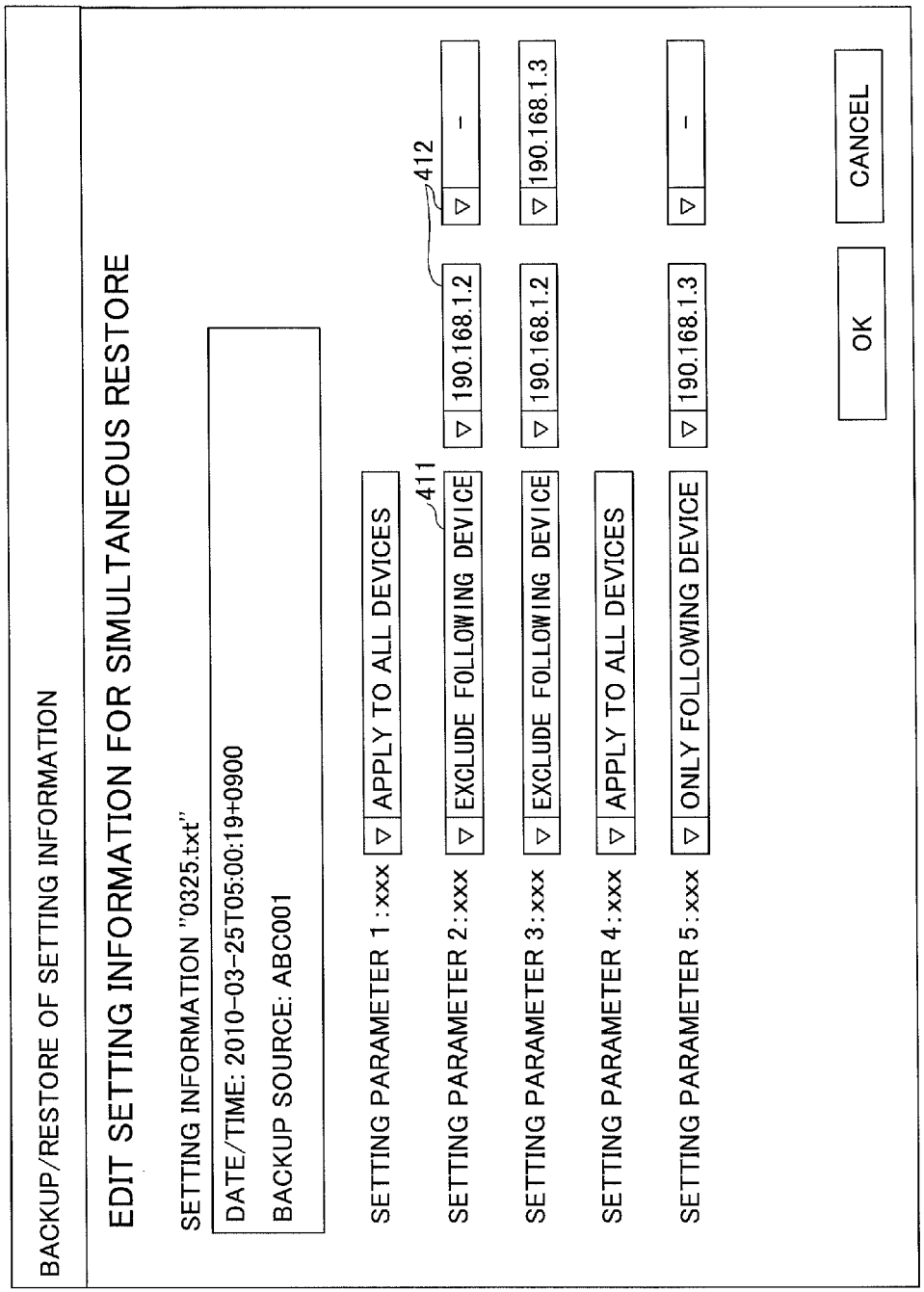
FIG. 16 illustrates an example of an operation screen according to modification 2.

FIG. 16 illustrates an example of an operation screen according to the present modification. When "edit setting information" 410 of FIG. 14 is pressed, the screen changes to the screen of FIG. 16. Here, it is assumed that 0325.txt is selected as the setting information to be applied in the USB memory 114d, by "refer" 403.

In this operation screen, as described above, the user can exceptionally edit the setting information to be transferred to all devices that are restore targets. For example, the setting parameters in the setting information can be edited by each setting parameter. Specifically, the user can edit whether each setting parameter is to be applied to the devices that are the target of simultaneous restore.

For example, the setting information "0325.txt" includes five setting parameters 1 through 5. Accordingly, in principle, when this setting information is transferred to all devices that are restore targets, each of the devices applies the setting parameters 1 through 5 to itself.

However, for example, when the user does not want to apply setting parameter 2: xxx to the image forming apparatus 1b (192.168.1.2), the user operates the selection list of "condition items" 411, and selects "exclude following device". Then, in "device specification item" 412, the user selects (inputs) "192.168.1.2".

For example, when the user does not want to apply setting parameter 3: xxx to the image forming apparatus 1b (192.168.1.2) and the image forming apparatus 1c (192.168.1.3), the user operates the selection list of "condition items" 411, and selects "exclude following device". Then, in "device specification item" 412, the user selects (inputs) "192.168.1.2" and "192.168.1.3".

For example, when the user wants to apply setting parameter 5: xxx only to the image forming apparatus 1c (192.168.1.3), the user operates the selection list of "condition items" 411, and selects "only following device". Then, in "device specification item" 412, the user selects (inputs) "192.168.1.3".

FIGS. 17A and 17B illustrate examples of setting information after being edited according to the present modification. The setting information in FIG. 17A has been edited for the image forming apparatus 1b (192.168.1.2). The setting information in FIG. 17B has been edited for the image forming apparatus 1c (192.168.1.3).

Specifically, as edited in the operation screen (FIG. 16), the setting information in FIG. 17A edited for the image forming apparatus 1b (192.168.1.2) only includes the setting parameters 1 and 4. The setting parameters 2, 3, and 5 that are originally included in the setting information "0325.txt" are deleted. Similarly, the setting information in FIG. 17B edited for the image forming apparatus 1c (192.168.1.3) only includes the setting parameters 1, 2, 4, and 5. The setting parameter 3 that is originally included in the setting information "0325.txt" is deleted.

Referring again to FIG. 15, in step S46, the device setting information management application 20 (simultaneous restore unit 20d) transfers the setting information read at step S42 to all of the acquired addresses (step S46). More precisely, the device setting information management application 20 (simultaneous restore unit 20d) sends a restore request including setting information. However, when the setting information is edited, the device setting information management application 20 (simultaneous restore unit 20d) sends the setting files to each of the devices that are restore targets. That is to say, the setting information in FIG. 17A is transferred to the image forming apparatus 1b (192.168.1.2), and the setting information in FIG. 17B is transferred to the image forming apparatus 1c (192.168.1.3). As a result, the setting information in FIG. 17A is applied to the image forming apparatus 1b (192.168.1.2), and the setting information in FIG. 17B is applied to the image forming apparatus 1c (192.168.1.3).

As described above, in a simultaneous restore process, the setting information to be simultaneously transferred can be edited. Therefore, by executing operation for one device that is a master, an arbitrary setting can be made on the information for an arbitrary device in the network. Accordingly, the flexibility of the restore process is improved.

According to one embodiment of the present invention, an image forming apparatus and a backup and restore processing method are provided, by which processing results are output when a backup/restore process is performed on setting information for a device, thereby enhancing convenience in managing devices.

The image forming apparatus and the backup and restore processing method are not limited to the specific embodiments described herein, and variations and modifications may be made without departing from the scope of the present invention.

The present application is based on Japanese Priority Patent Application No. 2011-255351, filed on Nov. 22, 2011 and Japanese Priority Patent Application No. 2012-181550, filed on Aug. 20, 2012, the entire contents of which are hereby incorporated herein by reference.

What is claimed is:

1. An image forming apparatus that operates according to setting information of the image forming apparatus, the image forming apparatus comprising:
a storage unit configured to store the setting information;
an interface configured to connect a portable storage medium to the image forming apparatus;

a first processing unit configured to read the setting information from the storage unit, write the setting information that has been read in the portable storage medium via the interface, read the setting information from the portable storage medium via the interface, and write the setting information that has been read in the storage unit; and a first log creating unit configured to,
create a first processing result log indicating a first processing result of a reading and writing process when the first processing unit reads the setting information from the storage unit and writes the setting information in the portable storage medium, and store the first processing result log in a predetermined storage location, the first processing result log indicating whether the first processing result was successful, and create a second processing result log indicating a second processing result of a reading and writing process when the first processing unit reads the setting information from the portable storage medium and writes the setting information in the storage unit, and store the second processing result log in the predetermined storage location, the second processing result log indicating whether the second processing result was successful.

2. The image forming apparatus according to claim 1, wherein the predetermined storage location is the portable storage medium.

3. The image forming apparatus according to claim 1, further comprising:
a communication unit configured to perform communications, the communication unit being connected to a network, wherein
the predetermined storage location is a terminal connected to the network, and
the first log creating unit sends the first processing result log or the second processing result log to the terminal via the communication unit.

4. The image forming apparatus according to claim 1, wherein
the first processing result and the second processing result includes information indicating that a process is successful or information indicating that a process is unsuccessful, and
the information indicating that a process is unsuccessful includes information indicating a reason why the process is unsuccessful.

5. An image forming apparatus that operates according to setting information of the image forming apparatus, the image forming apparatus comprising:
a storage unit configured to store the setting information;
an interface configured to connect a portable storage medium to the image forming apparatus;
a first processing unit configured to read the setting information from the storage unit, write the setting information that has been read in the portable storage medium via the interface, read the setting information from the portable storage medium via the interface, and write the setting information that has been read in the storage unit; and
a first log creating unit configured to
create a first processing result log indicating a first processing result of a reading and writing process when the first processing unit reads the setting information from the storage unit and writes the setting information in the portable storage medium, and store the first processing result log in a predetermined storage location, and create a second processing result log indicating a second processing result of a reading and writing process when the first processing unit reads the setting information from the portable storage medium and writes the setting information in the storage unit, and store the second processing result log in the predetermined storage location, a communication unit configured to perform communications, the communication unit being connected to a network, wherein
the predetermined storage location is a terminal connected to the network, and
the first log creating unit sends the first processing result log or the second processing result log to the terminal via the communication unit, a second processing unit configured to read the setting information from the storage unit, send the setting information to the terminal via the communication unit, receive a write request including the setting information from the terminal via the communication unit, and write the setting information that has been received in the storage unit; and a second log creating unit configured to
create a third processing result log indicating a third processing result of a reading and sending process when the second processing unit reads the setting information from the storage unit and sends the setting information to the terminal, and send the third processing result log to the terminal via the communication unit, and create a fourth processing result log indicating a fourth processing result of a writing and receiving process when the second processing unit receives the setting information from the terminal and writes the setting information in the storage unit, and send the fourth processing result log to the terminal via the communication unit.

6. The image forming apparatus according to claim 5, wherein
the first processing result indicated in the first processing result log and the second processing result indicated in the second processing result log created by the first log creating unit includes information of the portable storage medium as a storage location of the setting information, and
the third processing result indicated in the third processing result log and the fourth processing result indicated in the fourth processing result log created by the second log creating unit includes information of the terminal as a storage location of the setting information.

7. The image forming apparatus according to claim 5, wherein
the first log creating unit or the second log creating unit creates an intermediate processing result log indicating a progress status of a process when creating the first processing result log, the second processing result log, the third processing result log, or the fourth processing result log, and
reports the intermediate processing result log to a predetermined report destination via the communication unit, every time the intermediate processing result log is created.

8. The image forming apparatus according to claim 5, wherein when the first processing unit or the second processing unit writes the setting information in the storage unit, the first processing unit or the second processing unit sends a write request to write the setting information to another image forming apparatus via the communication unit.

9. The image forming apparatus according to claim 8, wherein
the write request includes information of the terminal to which a processing result log is to be sent, the processing result log indicating a processing result of writing and receiving the setting information performed by the another image forming apparatus.

10. A backup and restore processing method performed by an image forming apparatus that operates according to setting information of the image forming apparatus, the backup and restore processing method comprising:
a first processing step of reading the setting information from a storage unit, writing the setting information that has been read in a portable storage medium via an interface for connecting the portable storage medium to the image forming apparatus, reading the setting information from the portable storage medium via the interface, and writing the setting information that has been read in the storage unit; and
a first log creating step of
creating a first processing result log indicating a first processing result of a reading and writing process when the setting information is read from the storage unit and the setting information is written in the portable storage medium at the first processing step, and storing the first processing result log in a predetermined storage location, the first processing result log indicating whether the first processing result was successful, and
creating a second processing result log indicating a second processing result of a reading and writing process when the setting information is read from the portable storage medium and the setting information is written in the storage unit at the first processing step, and storing the second processing result log in the predetermined storage location, the second processing result log indicating whether the second processing result was successful.

11. A non-transitory computer-readable recording medium storing a program that causes a computer to execute the backup and restore processing method according to claim 10.

12. An system for backing up and restoring setting information of an image forming apparatus, system comprising:
a client device;
an image forming apparatus configured to receive an instruction that indicates one of a backup command and a restore command,
when the instruction indicates the backup command, the image forming apparatus is configured to,
read the setting information from a storage unit of the image forming apparatus,
at least one of (i) write the setting information that is read from the storage unit into a portable storage medium and (ii) transmit the setting information that is read from the storage unit to the client device,
create a first processing result log indicating a first processing result of (i) the reading the setting information from the storage unit, (ii) the writing the setting information into the portable storage medium, and (iii) the transmitting the setting information to the client device, the first processing result log indicating whether the first processing result was successful,
store the first processing result log in a desired storage location of the storage unit and in the portable storage medium, and
send the first processing result log to the client device;
when the instruction indicates the restore command, the image forming apparatus is configured to,
at least one of (i) read the setting information from the portable storage medium and (ii) receive the setting information from the client device,
write the setting information that is one of (i) read from the portable storage medium and (ii) received from the client device into the storage unit,
create a second processing result log indicating a second processing result of (i) the reading the setting information from the portable storage medium, (ii) the writing the setting information in the storage unit, and (iii) the receiving the setting information from the client device, the second processing result log indicating whether the second processing result was successful,
store the second processing result log in the desired storage location of the image forming apparatus.

13. The system of claim 12, wherein,
the first processing result log further indicates at least one of an installation location information indicating a position of the image forming apparatus, storage location indicating a location where the setting information is stored according to the first processing result, a time of that the first processing result occurs, a process type of the first processing result, device identification information of the image forming apparatus, and device identification information of the client device; and
the second processing result log further indicate at least one of an installation location information indicating a position of the image forming apparatus, storage location indicating a location where the setting information is stored according to the second processing result, a time of that the second processing result occurs, a process type of the second processing result, device identification information of the image forming apparatus, and device identification information of the client device.

14. The system of claim 12, wherein, in the writing the setting information that is read from the storage unit into a portable storage medium, the image forming apparatus is configured to:
convert the setting information into a desired format.

15. The system of claim 12, wherein, in the writing the setting information that is one of (i) read from the portable storage medium and (ii) received from the client device into the storage unit, the image forming apparatus is configured to:
convert the setting information into a desired format.

16. The system of claim 12, wherein the image forming apparatus is further configured to:
determine whether a difference exists between the setting information read from the storage unit and the setting information read from the portable storage medium; and
block the command indicated by the instruction when the determining determines that the difference does not exist.

17. The system of claim 16, wherein the first processing result log indicates a result of the determining, and the second processing result log indicates the result of the determining.

* * * * *